US010299442B2

(12) United States Patent
Vesty

(10) Patent No.: US 10,299,442 B2
(45) Date of Patent: May 28, 2019

(54) ROTARY PLANT GROWING APPARATUS

(71) Applicant: TOV CONSULTING LTD., Calgary (CA)

(72) Inventor: Warren Bamber Vesty, Calgary (CA)

(73) Assignee: ARC HYDROPONICS CORPORATION, Calgary, AB (CA)

( * ) Notice: Subject to any disclaimer, the term of this patent is extended or adjusted under 35 U.S.C. 154(b) by 208 days.

(21) Appl. No.: 15/179,618

(22) Filed: Jun. 10, 2016

(65) Prior Publication Data
US 2016/0360711 A1    Dec. 15, 2016

(30) Foreign Application Priority Data

Jun. 12, 2015 (CA) .................................. 2894331

(51) Int. Cl.
*A01G 31/04* (2006.01)
*A01G 9/26* (2006.01)

(52) U.S. Cl.
CPC ............ *A01G 9/26* (2013.01); *A01G 31/047* (2013.01); *Y02A 40/274* (2018.01); *Y02P 60/216* (2015.11)

(58) Field of Classification Search
CPC ...... A01G 31/047; A01G 31/00; A01G 31/02; A01G 31/04
See application file for complete search history.

(56) References Cited

U.S. PATENT DOCUMENTS

| 5,372,474 | A | * | 12/1994 | Miller | ................... | F03B 17/005 |
|---|---|---|---|---|---|---|
| | | | | | | 415/1 |
| 5,515,648 | A | * | 5/1996 | Sparkes | ................ | A01G 7/045 |
| | | | | | | 47/65 |
| 6,604,321 | B2 | | 8/2003 | Marchildon | | |
| 6,840,007 | B2 | * | 1/2005 | Leduc | .................... | A01G 31/02 |
| | | | | | | 47/48.5 |
| 7,181,886 | B2 | | 2/2007 | Bourgoin et al. | | |

(Continued)

FOREIGN PATENT DOCUMENTS

| CA | 2343254 C | 7/2001 |
|---|---|---|
| CA | 2460465 C | 9/2004 |

(Continued)

OTHER PUBLICATIONS

Alton Millett Porter, "Effect of Light Intensity on the Photosynthetic Efficiency of Tomato Plants", http://www.plantphysiol.org/content/12/2/225.full.pdf, Plant Physiology, Apr. 1937, pp. 225-252, vol. 12, No. 2, American Society of Plant Biologists.

(Continued)

*Primary Examiner* — Kristen C Hayes

(57) ABSTRACT

A rotary plant growing apparatus is disclosed having a light emitting source operable to emit light. The apparatus also has at least one retaining component and a support operable to support the at least one retaining component in spaced relation to the light emitting source. A rotation mechanism is operable to rotate the at least one retaining component in a path around the light emitting source. A position adjustment mechanism is operable to move the at least one retaining component along a path extending between the at least one retaining component and the light emitting source so to adjust the distance between the at least one retaining component and the light emitting source.

29 Claims, 16 Drawing Sheets

(56) References Cited

U.S. PATENT DOCUMENTS

| | | | | |
|---|---|---|---|---|
| 7,401,437 B2* | 7/2008 | Dumont | ............... | A01G 31/047 47/59 R |
| 7,549,250 B2* | 6/2009 | Feuz | ............. | A01G 31/04 47/39 |
| 7,559,173 B2* | 7/2009 | Brusatore | ............ | A01G 31/047 47/59 R |
| 7,730,663 B2 | 6/2010 | Souvlos et al. | | |
| 7,818,917 B2* | 10/2010 | Brusatore | ............ | A01G 31/047 47/59 R |
| 2005/0039396 A1* | 2/2005 | Marchildon | ......... | A01G 31/047 47/62 E |
| 2005/0055878 A1* | 3/2005 | Dumont | ............... | A01G 31/047 47/62 R |
| 2007/0251145 A1* | 11/2007 | Brusatore | ............ | A01G 31/047 47/83 |
| 2008/0236036 A1* | 10/2008 | Feuz | ............. | A01G 31/04 47/39 |

FOREIGN PATENT DOCUMENTS

| | | | | |
|---|---|---|---|---|
| CA | 2647610 A1 | 6/2009 | | |
| JP | 4880082 B1 * | 2/2012 | ............... | A01G 7/00 |
| WO | WO-2006003645 A2 * | 1/2006 | ............. | A01G 9/022 |

OTHER PUBLICATIONS

Sheena Mago, Undergraduate Project, "Photosynthesis: The Effect of Wavelength and Light Intensity on the Rate of Photosynthesis", https://stonybrook.digication.com/sheena_mago/d2, Digication, Inc. Copyright © 2016.

Steven R. Spilatro, "Preparing a photosynthesis light response curve", http://www.marietta.edu/~spilatrs/biol103/photolab/photosyn.html, Photosynthesis Investigation Study Guide, Department of Biology, Marietta College, Marietta, Ohio, U.S.A., Copyright © 1998, Steven R. Spilatro.

Salk Institute, Yi Tao et al., "Plants Grow Spindly When Reaching for Sunlight: Now Researchers Understand How", http://www.sciencedaily.com/releases/2008/04/080403125601.htm, ScienceDaily, Apr. 8, 2008.

Ted Marchildon, "Omega Garden—Revolutionary Gardening?", http://www.omegagarden.com/images/articles/future_grow.pdf, Gardening Inc., Futuregrow, www.omegagarden.com, Oct. 12, 2011.

University of Lethbridge, "Photosynthetic Gas Exchange Measurements", Biology 3460—Week 4, Biology 3460—Lab Exercise 4, Part a, http://classes.uleth.ca/201201/biol34601/04a-Photosynthetic%20Gas%20Exchange%20Sp'12.pdf, Jan. 25, 2012.

* cited by examiner

ROTARY PLANT GROWING APPARATUS

CROSS-REFERENCE TO RELATED APPLICATIONS

This application claims the foreign priority benefit of corresponding Canadian Patent Application Serial No. 2,894,331 filed on Jun. 12, 2015. The contents of the aforementioned foreign application are incorporated by reference herein.

TECHNICAL FIELD

This invention relates to rotary plant growing apparatuses and related methods of growing plants.

BACKGROUND

Lighting, along with environment is one of the two most important factors in the way plants grow and develop fruit and flowers. Nutrients do play a vital role but only if lighting and environment are in the appropriate range for the nutrients to take full effect. Artificial light sources pose a variety of potential problems forcing plants to adjust and adapt compromising maximum growth and productivity. It is known that in general, light intensity and light energy are strongly correlated to the level of vegetative growth and if appropriate fruit production, in plants. It is conceivable that a very broad range of the electromagnetic radiation wavelength spectrum may be relevant to growing organisms such as plants. Typically, but not limited as such, the portion of the spectrum that is normally relevant will from ultra-violet (wavelengths of about 10 nm to about 380 nm) through visible light into the infra-red spectrum (wavelengths of about 700 nm to about 1000 nm). Of particular utility, is light in the visible spectrum with wavelengths in the range of about 380 nm to 700 nm.

The greater the level of light intensity and corresponding light energy, then the greater is the amount and/or rate of vegetative growth and possibly fruit production. Light intensity (the amount of light power transferred per unit area) is inversely related to the distance of the plant from the light source squared—meaning that the closer a plant is to its light source, the greater the potential photosynthetic benefit it receives. There is a distance, which varies from plant species to plant species, after which if reduced, plants become saturated by the amount of light energy being received, and any reduction in distance between the plant and its light source ceases to have positive effects on the plant's growth. This point is referred to in the art as the point of light saturation. At a slightly greater distance from said point of saturation however, is the plant's optimal distance from its light source, at which the plant's internodal spacing is minimized, and vegetative growth and fruit production are maximized.

Some facilities for growing plants have the plant growing media/plant containers/plants laid out horizontally, such as in a greenhouse, to capitalize on the use of natural light Use of artificial light sources present problems, with such layouts both horizontal and vertical, not all plants in a group of plants can be placed at an optimal distance from their light sources throughout their entire growth cycle. Plants situated further from the artificial light source may receive exponentially less light than those closer to the light source. Disadvantaged plants can also exhibit negative responses to the light emitted from the light sources, leading for example to curvature defects and decreased vegetative growth in a phenomenon known as "shade avoidance syndrome" (SAS). To minimize the impact of SAS it may require increased inter-nodal spacing between plants.

Some known devices used for growing plants employ moving light apparatuses or rotating apparatuses which may continuously rotate plants relative to their light sources. While these devices may serve to mitigate or "even out" the effects of SAS, they may deprive some plants in the group of plants being grown from receiving optimal light intensity/energy. Such devices may also be power and labor intensive. In horizontal or vertical layouts, maximizing photosynthesis over the entire group of plants can only be achieved through the use of multiple lights to approximate a uniform intensity over the entire layout, further increasing power requirements and possibly requiring cooling systems to be utilized. Furthermore, light sources in horizontal layouts typically fail to function at peak efficiency, releasing radiation in all directions due to the phenomenon of "scattering."

To attempt to provide optimal photo-synthetically active radiation (PAR) that reaches all plants in a group of plants, and to try to save the amount of power consumed and the cost of labor incurred, more efficient/effective ways of growing plants are desirable.

Canadian Patent Document 2,343,254 discloses a rotating drum mounted on a base in such a way as to enable the rotation of said drum around a light source positioned at the rotational axis of said drum. The surface of the drum contains holes for plant pots to be placed in, in such a way that the plants grow radially inwardly from the drum circumference and toward the central light source. The radial distribution of the plants ensures may provide a relatively more even distribution of light intensity to the plants held in the device without extra lighting being required, alleviating SAS and ensuring a generally consistent PAR level for the plants. Light previously lost to the "scatter" phenomenon is substantially directed to plant pots positioned radially around the light source. Substantial energy costs may be also alleviated, because using a motor to drive a rotary device may reduce overall energy requirements. The rotation of the plants has the added benefit that the positive phototrophic responses and negative responses associated with gravity of the plants can be mitigated, and may result in a further increase in vegetative growth without any corresponding increase in required labor. Light previously lost to the "scatter" phenomenon may become photo-synthetically active radiation, reaching plants positioned all around the light source. During rotation, the plant pots may also pass through a reservoir containing water and a nutrient solution located at the base of the rotary device, watering the occupants once per rotation.

However, the apparatus disclosed in Canadian Patent 2,343,254 has some disadvantages. The inflexible drum allows for an even distribution of light to all plants, but the distribution occurs at a fixed intensity. Without being able to vary the distance between the plants and the light source, light intensity can only be optimal for specific plants, or plants at specific stages of growth. A further disadvantage results from the nutrient reservoir as a watering means. After the plants and plants growing medium have passed through the reservoir, they often drip on the light source, having become oversaturated by liquid. In addition to the maintenance problems caused by said dripping, the oversaturation of the medium is often not optimal for the plant's growth, and the excess liquid content can encourage the propagation of harmful molds and fungi.

To enable variations in the light intensity experienced by the plants within the apparatus, Canadian patent 2,460,465 discloses an apparatus which employs a variable diameter ring comprised of separate interlocking ring segments assembled exteriorly of the laterally running medium retaining members. By using an external ring instead of a static cylindrical or drum shape, ring segments may be added or removed to cause variations in the diameter of said cylinder according to the needs of the plants at a specific growth stage. In this way some limited variations in the proximity of the plants to the light source can be achieved. Also, instead of a reservoir, Canadian patent 2,460,465 discloses an injection based watering system located exteriorly of the ring and medium retaining members, allowing for the timed release of water and nutrients to said members.

However Canadian patent 2,460,465 also has some shortcomings. Modifications made to the medium retaining members affect all the medium retaining members at the same time. The calculation of optimal light intensity made by the grower will typically be an average of the plants in all of the medium retaining members. Further inconvenience may result from the addition and subtraction of ring segments that is necessary in order to make significant adjustments to the diameter at which the medium retaining members are held. As the plants within the apparatus grow, the diameter may be increased by the addition of ring segments and medium retaining members. However, medium retaining members must either be empty or must contain plants already at the optimal growth stage to benefit from addition to the apparatus. This presupposes the growth of said plants being undertaken elsewhere, such as other rotary devices of varying scales. Like other rotary devices in the prior art, a number of devices built on varying scales are required for optimal light intensity across an entire yield throughout the plants' entire growth cycles. The distance of the plants can only be stepped at discrete changes thus it does nothing to optimize light at all times.

A further inconvenience arises from the fact that the ring shape itself should be comprised of at least about eight segments to be substantially circular. Any decrease in the number of segments from the cylindrical layout formed by the medium retaining members becomes increasingly polygonal in shape, causing exponential differences in intensity experienced by those plants further from the light source, and reintroducing the symptoms of SAS as described above.

Another inconvenience results from the immobility of the watering system. A plurality of liquid injectors extends from a main liquid distribution member, which is in turn attached to a water source. Because each injector does not have its own unique liquid input port, each distribution member must have a predetermined and unchangeable number of injectors attached. A further problem arises from the immobility of the watering element. Because the element is unable to advance or retreat along a predetermined path to penetrate or exit the medium retaining member, the injection designed to obviate dripping is less than optimal.

Accordingly, an improved rotary plant growing apparatus is desirable. It is desirable to provide a rotary plant growing device capable of providing substantially optimal light intensity for the plants throughout their entire life cycles, while at the same time attempting to reduce at least some of the most significant problems in known rotary devices. These problems include, but are not limited to: cumbersome, problematic, imprecise or non-existent light intensity modifiability and; dripping of liquid on the central light source. It is desirable to provide rotary devices which: provide a more consistent light intensity distribution over the entire group of plants; obviate or at least reduce shade avoidance syndrome and its symptoms; and provide improved vegetative growth/fruit yield production; and be more energy efficient.

SUMMARY

According to one aspect of the invention there is provided rotary plant growing apparatus comprising: (a) a light emitting source operable to emit light; (b) at least one retaining component; (c) a support operable to support the at least one retaining component in spaced relation to the light emitting source; a rotation mechanism operable to rotate the at least one retaining component in a path around the light emitting source; and (e) a position adjustment mechanism operable to move the at least one retaining component along a path extending between the at least one retaining component and the light emitting source so to adjust the distance between the at least one retaining component and the light emitting source.

According to one aspect of the invention there is provided a rotary plant growing apparatus comprising: (a) a light emitting source operable to emit light; (b) a plurality of retaining components; (c) a support operable to support the plurality of retaining components in spaced relation to the light emitting source; (d) a rotation mechanism operable to rotate the plurality of retaining components in paths around the light emitting source; (e) a position adjustment mechanism operable to independently move each of the plurality of retaining components to independently adjust the distances between each of the plurality of retaining components and the light emitting source.

According to one aspect of the invention there is provided a method of growing a plant comprising: (a) rotating at least one retaining component about a light emitting source, the light emitting source operable to emit light; (b) adjusting the distance between the at least one retaining component and the light emitting source by moving the at least one retaining component along a path in a direction towards or away from the light emitting source.

According to one aspect of the invention there is provided a method of growing a plurality of plants comprising: (a) rotating a plurality of retaining components each containing a plant about a light emitting source, said light emitting source operable to emit light; (b) independently adjusting the distance between each of the plurality of retaining components and said light emitting source by independently moving each of the plurality of retaining components along linear radial paths from said light emitting source.

According to one aspect of the invention there is provided a method of growing a plurality of plants, the plurality of plants held in a plurality of retaining components. The method comprises: rotating each of the plurality of retaining components about a light emitting source, the light emitting source operable to emit light; and independently adjusting the distance between each of the plurality of retaining components and the light emitting source by independently moving each of the plurality of retaining component towards and/away from the light emitting source.

According to one aspect of the invention there is provided a rotary plant growing apparatus comprising: (a) a light emitting source operable to emit light; (b) at least one retaining component; (c) a support mechanism operable to support the at least one retaining component in spaced relation to the light emitting source; (d) a rotation mechanism operable to rotate the at least one retaining component around the light emitting source aligned with an axis of rotation; (e) at least one position adjustment mechanism operable to move the at least one retaining component along a linear radial path extending between the at least one retaining component and the axis so to adjust the linear distance between the at least one retaining component and the light emitting source.

According to another aspect of the invention there is provided a rotary plant growing apparatus comprising: (a) a light emitting source operable to emit light;(b) at least one retaining component; (c) a support operable to support the at least one retaining component in spaced relation to the light emitting source; (d) a rotation mechanism operable to rotate the at least one retaining component in a path around the light emitting source; (e) a dispensing assembly operable to dispense liquid nutrients and/or water into said at least one retaining component, wherein the dispensing assembly comprises a probe movable between a first position wherein the probe is remote from the at least one retaining component and a second position wherein the probe is within the at least one retaining component.

According to another aspect of the invention there is provided a rotary plant growing apparatus comprising: a light emitting source operable to emit light; at least one retaining component; a support operable to support said at least one retaining component in spaced relation to said light emitting source; a rotation mechanism operable to rotate said at least one retaining component in a path around said light emitting source; a hood at least partially enclosing within an interior said light emitting source, said at least one retaining component said support and said rotation mechanism.

According to another aspect of the invention there is provided a rotary plant growing apparatus comprising: (a) a light emitting source operable to emit light; (b) at least one retaining component; (c) a support operable to support the at least one retaining component in spaced relation to the light emitting source; (d) a rotation mechanism operable to rotate the at least one retaining component in a path around the light emitting source; (e) a position adjustment mechanism operable to move the at least one retaining component along a path towards and away from the light emitting source so to adjust the distance between the at least one retaining component and the light emitting source; (f) a controller operable to control the operation of the adjustment mechanism.

BRIEF DESCRIPTION OF THE FIGURES

In figures which illustrate by way of example only embodiments.

DETAILED DESCRIPTION

Figure 1:
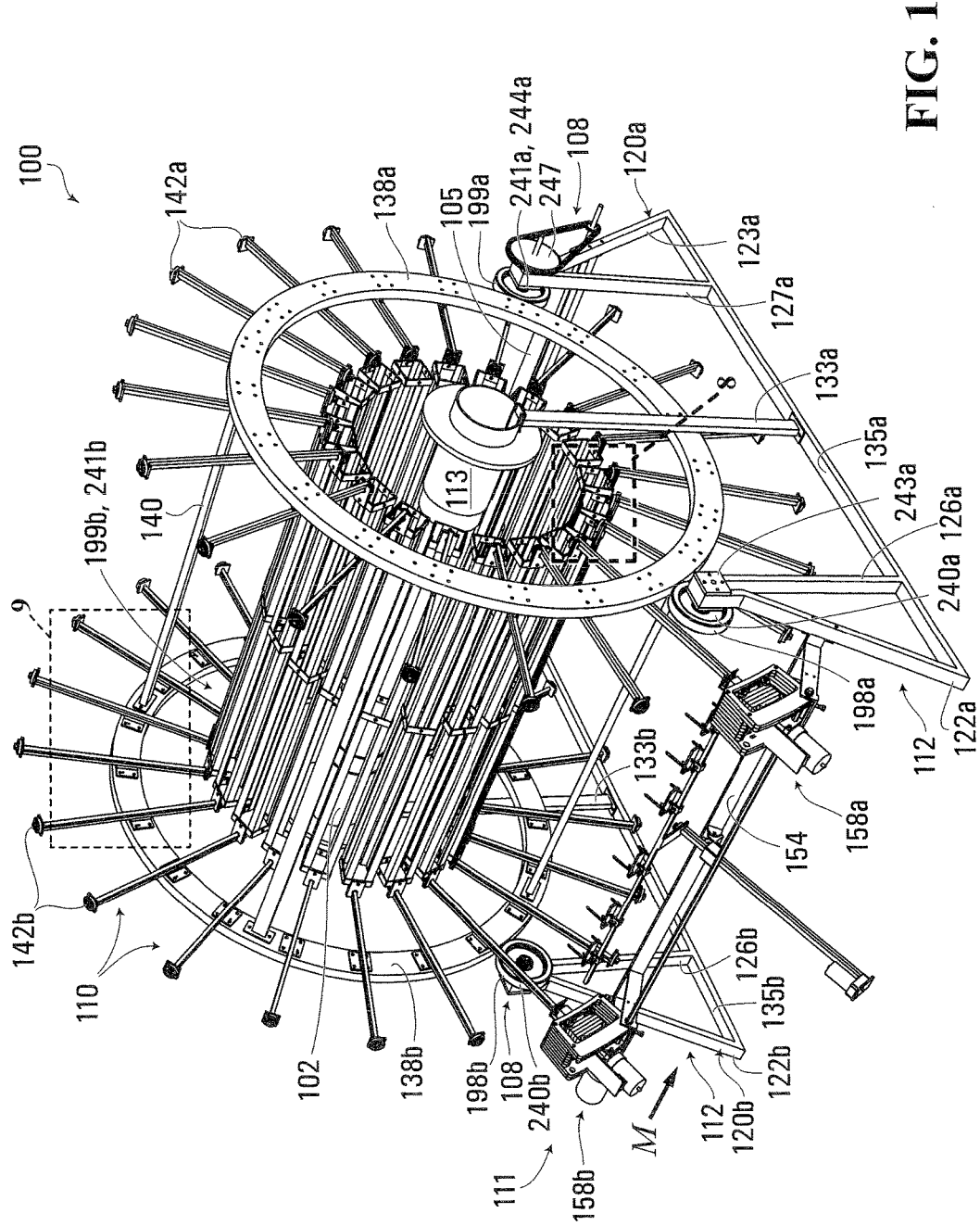
FIG. 1 is a top perspective view of a rotary plant growing apparatus.
Figure 2:
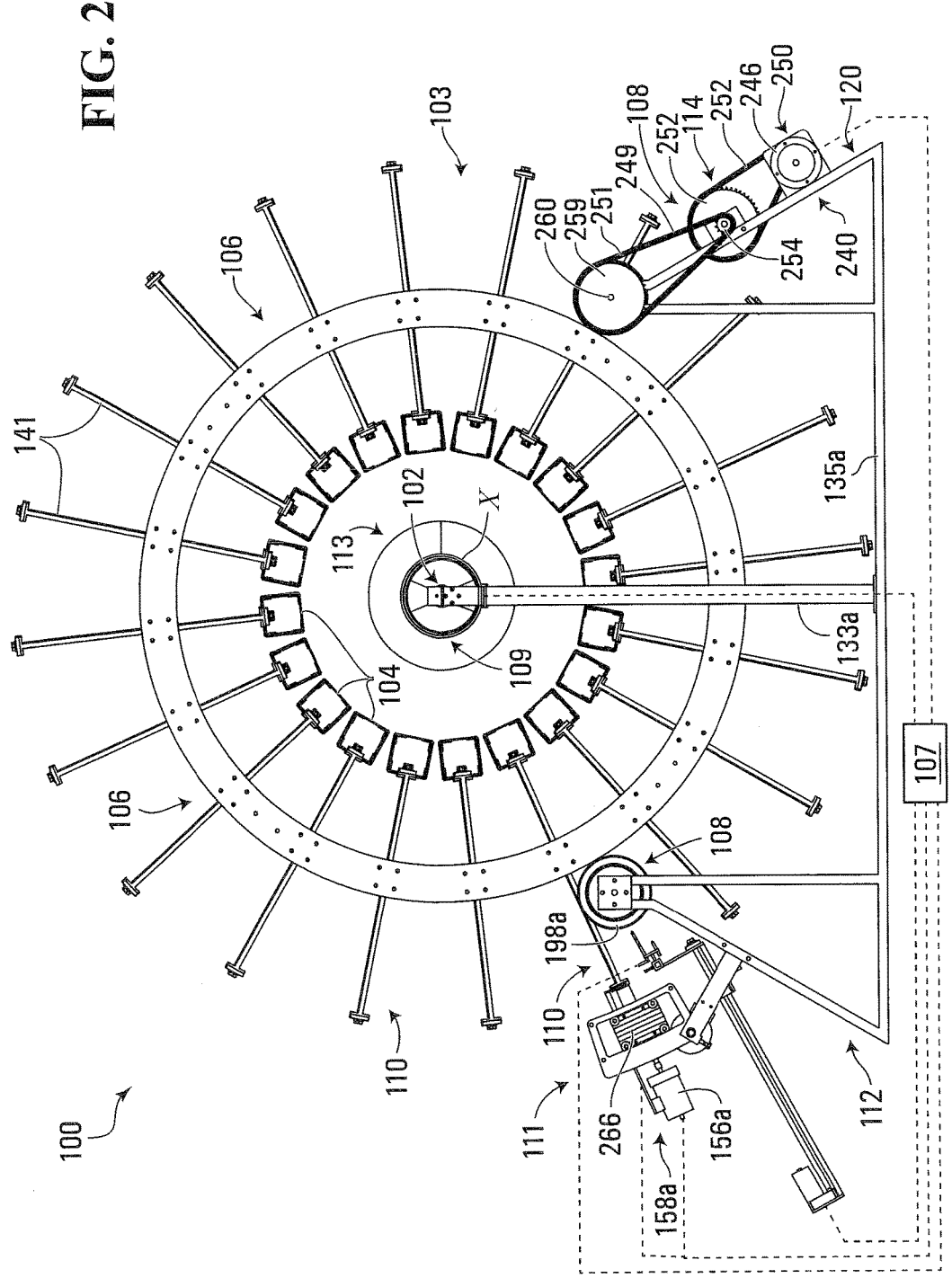
FIG. 2 is front elevation view of the rotary plant growing apparatus of FIG. 1 with retaining components shown in fully radially inward positions.

With reference initially to FIGS. 1 and 2, a rotary plant growing apparatus generally designated 100 may include a light support unit 113 having a light emitting source 102, a support frame generally designated 112, a plant rotating assembly designated 103 and a rotational drive mechanism 114. Various components of plant growing apparatus 100, including all motors as described hereinafter, may be controlled by any suitably programmed microprocessor based device herein after referred to as a Programmable Logic Controller (PLC) 107 such as a Control Logix PLC made by Rockwell Automation. PLC 107 may also receive signals from various sensors of apparatus 100, as referenced hereinafter.

Plant rotating assembly 103 may include one or more plant retaining components 104 that may be transversely extending. Plant rotating assembly may also include a retaining component support 106. Plant growing apparatus 100 may also include a retaining component position adjustment mechanism 110. Retaining component position adjustment mechanism 110 may be operable to co-operate with the retaining component support 106 to separately adjust the position and distance of each of the retaining components 104 relative to the light emitting source 102. The position and distance of each of the retaining components 104 relative to the light emitting source 102 may be adjusted along a path. The path of the retaining components 104 may be linear in some embodiments and may be non-linear in other embodiments. The path toward the light emitting source 102 may be a radial path extending between each of the retaining components and the axis of rotation of the retaining components. The path may be linear extending between each of the retaining components and light emitting source 102. The position of each retaining component along the path may be infinitely adjustable within a specific range of movement. The position of each retaining component 104 along a path may be infinitely adjustable within a specific range of movement under control of PLC 107. It may not be necessary for there to be any human intervention in order to adjust the position of retaining component 104.

A rotation mechanism 108 may also be provided which is operable to rotate plant rotating assembly 103, including the retaining components 104, such that the retaining components move in orbital paths about the light emitting source 102. Such paths may be circular or in some embodiments non-circular, about a central longitudinally extending axis X (FIG. 2). Retaining components 104 and retaining component support 106, forming at least part of a plant rotating assembly 103, may be configured to be rotated by rotation mechanism 108 about central longitudinally extending axis X (FIG. 2).

Rotation mechanism 108 may include a rotational drive mechanism 114 that is operable to drive the plant rotating assembly 103 in rotation about light emitting source 102 and about longitudinal axis X.

Light emitting source 102 may potentially emit electromagnetic radiation across a broad range of the electromagnetic radiation wavelength spectrum from within the ultraviolet (wavelengths of about 10 nm to about 380 nm) through visible light into the infra-red spectrum (wavelengths of about 700 nm to about 1000 nm). Of particular utility in growing plants is light in the visible spectrum with wavelengths in the range of about 380 nm to 700 nm.

Light emitting source 102 may be provided in a light support unit 113 being generally tubular in shape and have a longitudinal axis located in substantial axial alignment with longitudinal axis X. Light support unit 113 may have a light emitting source 102 that may for example be a longitudinally extending, generally cylindrical, light source with a transparent cylindrical housing 109 spaced from and surrounding the light emitting source 102 (FIG. 2). Light emitting source 102 may be operable to emit light radially outward along its longitudinal length along axis X through cylindrical housing 109. By way of example light emitting source 102 may be an Eye HPS Grow light device made by Hortilux. The power of the light emitting source 102 will typically be fixed but could be adjustable to vary the amount of light energy emitted and light intensity received at a given distance from the light emitting source.

In one example embodiment, tubular housing 109 of light support unit 113 may be part of an Heating/Cooling/Ventilation/Air-conditioning (HVAC) system whose functions may include extraction of heat from the tubular housing 109.

Functions of tubular housing 109, including the output power of light emitting source 102 and the HVAC functions, may be controllable such as with PLC 107, for example to control the amount of light energy emitted radially to be received by plants held in retaining components 104, longitudinally along the length of the retaining components. Thus, plants held in the retaining components 104 may be exposed to light energy emitted from light emitting source 102.

Plant growing apparatus 100 may also include a support frame generally designated 112 the components of which may be made of one or more suitable materials such as by way of example only mild steel, aluminum, plastic, and stainless steel.

Support frame 112 may include two interconnected, substantially similar support stand assemblies 120a, 120b which may be configured and operable to support plant rotating assembly 103 including retaining components 104 and retaining component support 106, as well as rotation mechanism 108 and position adjustment mechanism 110. Support frame 112 may also include support members 133a, 133b to support light emitting source 102.

Two support stand assemblies 120a, 120b of support frame 112 may oriented generally transversely and parallel to each other (eg. generally perpendicular to longitudinal rotational axis X) and may be secured and connected together by interconnection of one or more longitudinally extending cross members such as cross members 105 as well as by interconnection to a longitudinally extending cross member 154 (FIG. 3), at each of their ends to the stand assemblies 120a, 120b. Thus a generally 4-sided support base structure can be provided for plant rotating assembly 103 and other components of plant growing apparatus 100.

Vertically upstanding light emitting source support members 133a, 133b may be joined to, and extend from, respective bottom support plates 135a, 135b of respective support stand assemblies. Vertical support members 133a, 133b may be connected at approximately the center of the length of bottom plates 135a, 135b respectively and extend vertically to approximately the center of plant rotating assembly 103.

Because both stand assemblies 120a, 120b may be substantially the same in structure with the same component parts, in portions of this description, only one may be described, although it will be understood that two substantially the same, generally longitudinally spaced and transversely oriented stand assemblies 120a, 120b may be provided to support other components of plant growing apparatus 100.

In a further example embodiment, a tray (not shown) may also be provided and be connected to each of the stand assemblies 120a, 120b together to collect waste that may fall from the rotary assembly 103, including retaining components 104.

Figure 3:
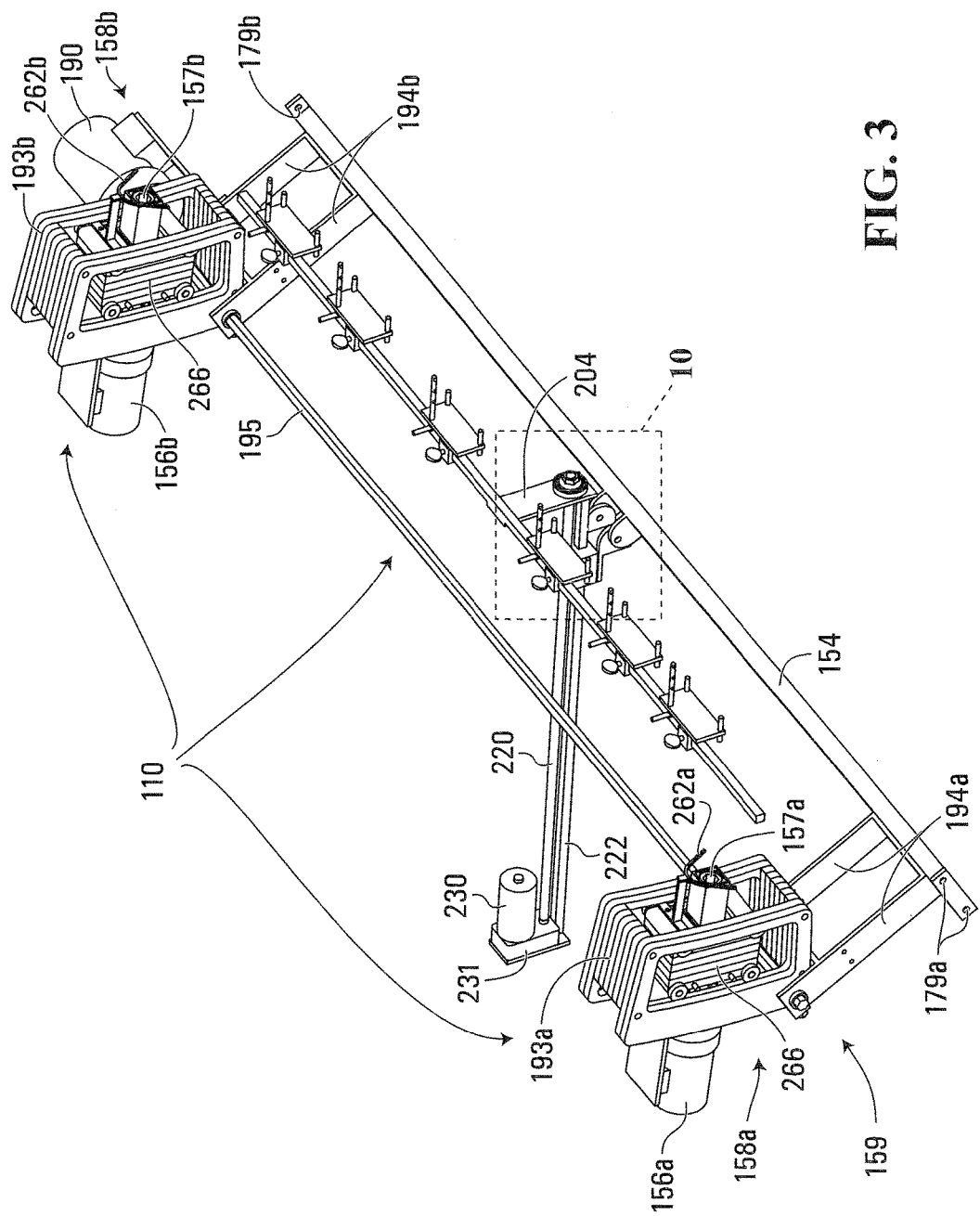
FIG. 3 is a perspective view of part, in isolation, of the rotary plant growing apparatus of FIG. 1.

Bottom support plates 135a, 135b may form the base of stand assembly 120a, 120b that supports plant growing apparatus 100 on a suitable support surface, such as for example a floor in a building. Extending upwards at opposed oblique angles at and from each end of bottom support plates 135a, 135b may be pairs of support members 122a/123a and 122b/123b respectively. Support members 122a, 123a may each also have a vertical support member 126a/127a connected thereto at upper ends thereof. The bottom ends of vertical support members 126a/127a may be connected to bottom plate 135a. Similarly, support members 122b, 123b may each have a vertical support member 126b/127b connected thereto at upper ends thereof. The bottom ends of vertical support members 126b/127b may be connected to bottom plate 135b. Support members 122a, 122b may be connected to each other by cross member 154. Support members 123a, 123b may also be connected to each other by cross member 105. As will be described in further detail hereafter, cross member 154 may also be used to support a fluid dispensing apparatus 188 and an actuator drive mechanism 111 for position adjustment mechanism 110 (FIGS. 1 and 3). All the foregoing connections of components in support frame 112 may be made by any suitable attachment device/method such as by welding, nuts/bolts, etc.

Each of retaining components 104 may extend longitudinally and be configured to hold one or more plants/plant seeds to be grown. Each of retaining components 104 may in some example embodiments also be configured to hold a plant growing medium, which may be a soil and/or a non-soil medium such as rockwool/perlite/aeroponic restraining method. For example, each of retaining components 104 may be configured to retain a plurality of longitudinally spaced plant containers (such as plant pots), each plant container holding one or more plants and typically also a plant growing medium.

Each retaining component 104 may comprise a plurality of longitudinally extending retaining members 124a-d (FIG. 4) oriented in generally spaced, parallel longitudinal alignment with each other, and being operable to be moved together in unison so that each retaining component 104 may be positioned at variable spaced radial distances from rotational axis X and light emitting source 102 (FIG. 2). Retaining members 124a-d may be made from one or more of any suitable material such as by way of example only aluminum, plastic, stainless steel, mild steel.

Figure 4:
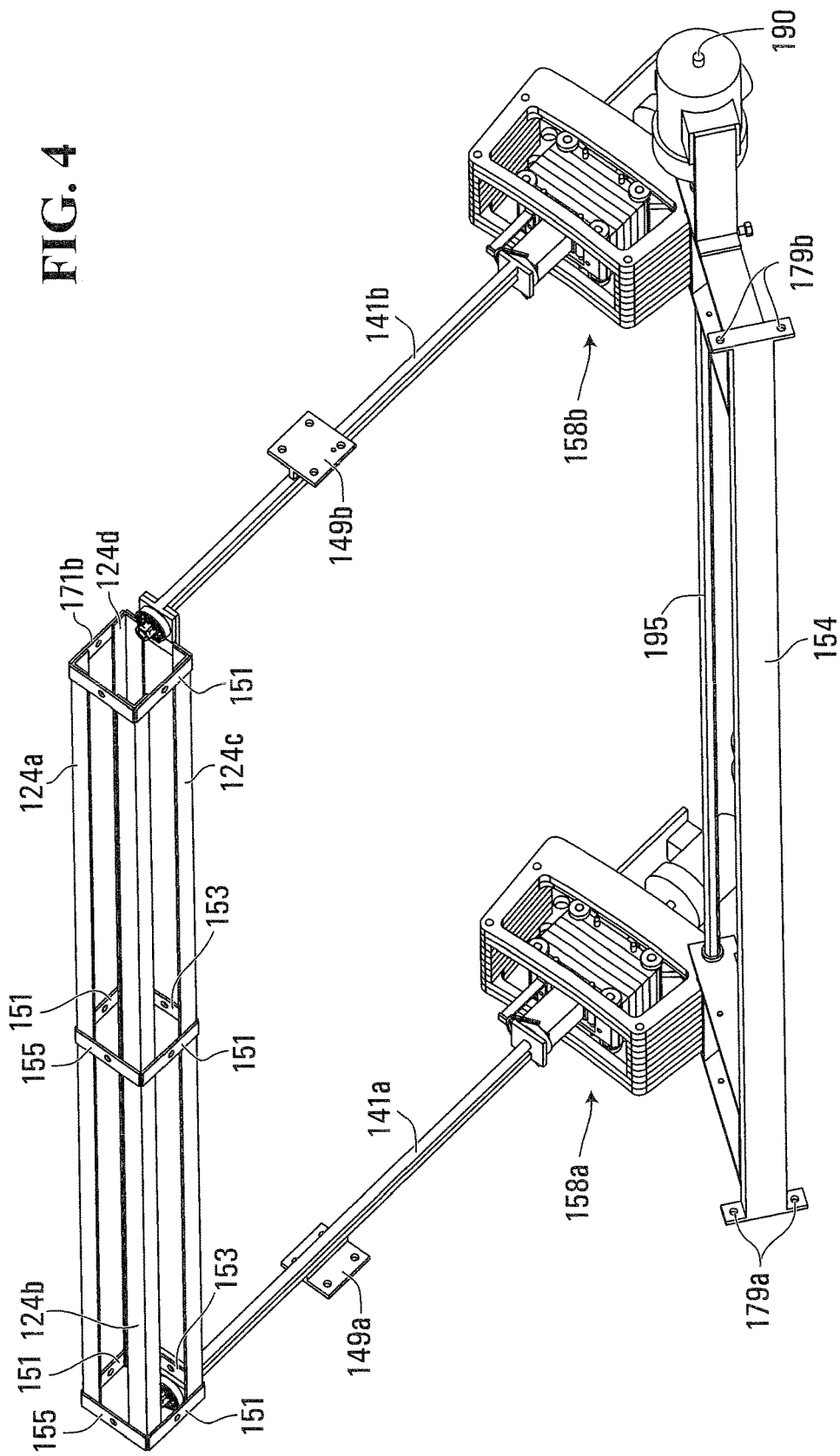
FIG. 4 is an alternate perspective view of the part shown in FIG. 3, coupled to another part of the rotary plant growing apparatus of FIG. 1.

Referring in particular now to FIG. 4, retaining members 124a-d may in some example embodiments be configured as four L-shaped (in transverse cross-section), longitudinally extending, bracket members with one L-shaped bracket member at each of the four corners of a cuboid space. Together such bracket members 124a-d may form the edge profile for a cuboid space for the retention of one or more, generally separate, plant containers (such as generally cubic shaped plant pots) that may contain one or more plants/plant seeds and possibly one or more types of soil or non-soil plant growing medium. In another embodiment, L-bracket members 124a-d may be attached to longitudinally extending sidewall panel members (such as for example planks or boards) to form longitudinally extending boxes that define a plant holding area of retaining components 104. Such sidewall panel members (not shown) may be made from any suitable material(s) such as by way of example only natural or composite wood products, aluminum, plastic, stainless steel. The sidewall panel members may be provided with apertures facing outwardly of each of the panel members, to allow for the injection of water and nutrients, as well as apertures facing inwardly of each of the panel members, to allow the growth of the plants toward the light emitting source 102.

Figure 8:
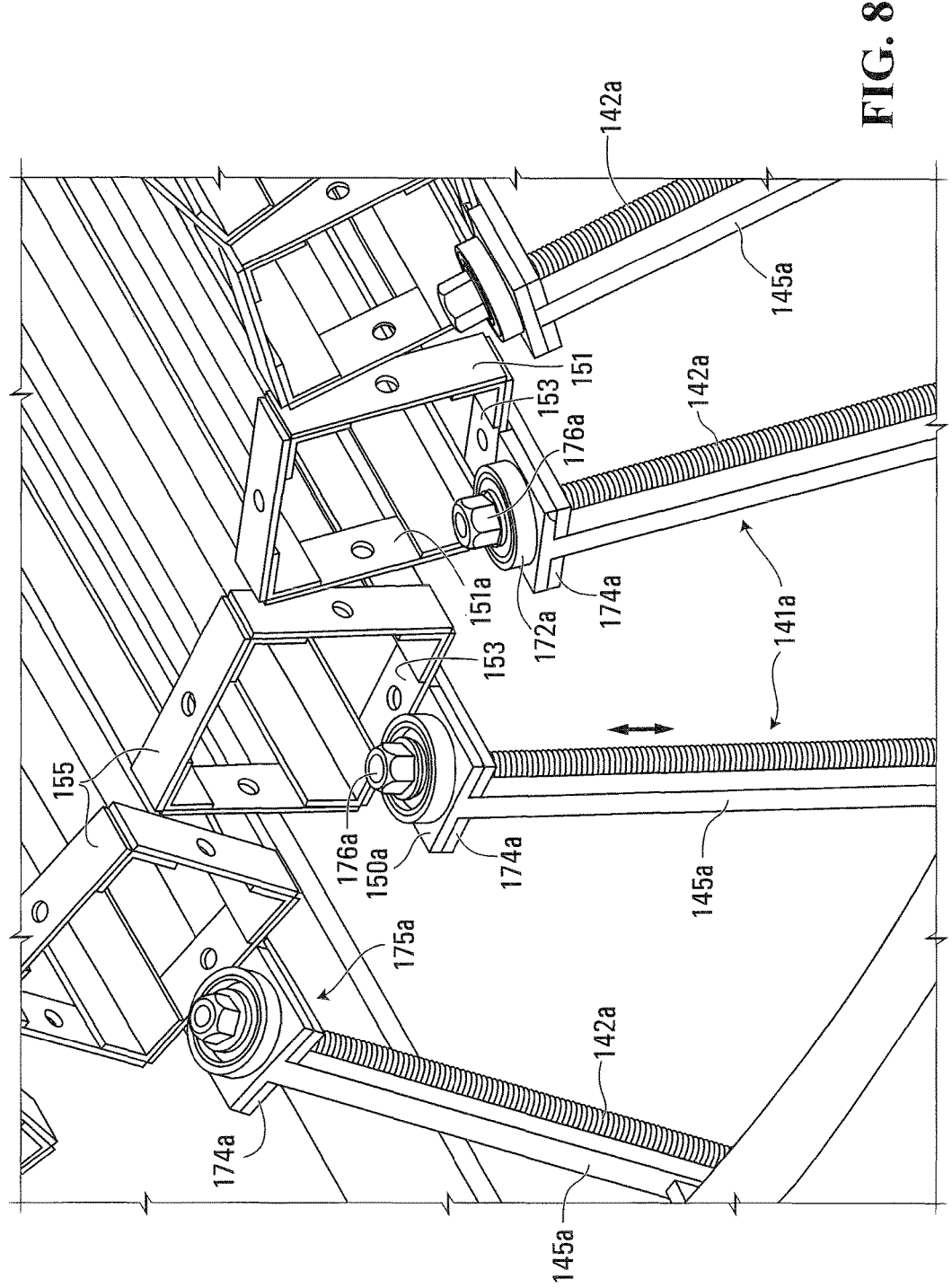
FIG. 8 is an enlarged perspective view of a portion marked 8 in FIG. 1, of the growing apparatus of FIG. 1.

The four L-bracket members 124a-d may be held in fixed relation to each other by a plurality of longitudinally spaced, transversely oriented, upper and lower plate members 171 151, and side plate members 155, 153 (FIGS. 4 and 8). Plate members 171, 151, 155 and 153 may be made from any suitable material(s) such as by way of example only plastic, stainless steel, aluminum, mild steel. Plate members 171, 151, 155 and 153 may be joined to bracket members 124a-d by any suitable attachment mechanisms such as screws, nuts/bolts, welding etc. In some embodiments, plate members 171, 151, 155 and 153 may be configured to be of adjustable length. This may be achieved by rendering different lengths and shapes of plate members. In particular, by providing longer and shorter sizes and different shapes of the members, and using such alternately sized members to attach to bracket members 124a-d, the interior space of each retaining component 104 can be made variable along two of three axes. Additionally, a spring biased adjustment mechanism may be employed with the plates members and the bracket members to permit the interior space to be easily varied in size and configuration. This may be advantageous since plant growing media, containers, and/or plants may have varying sizes and shapes.

Figure 9:
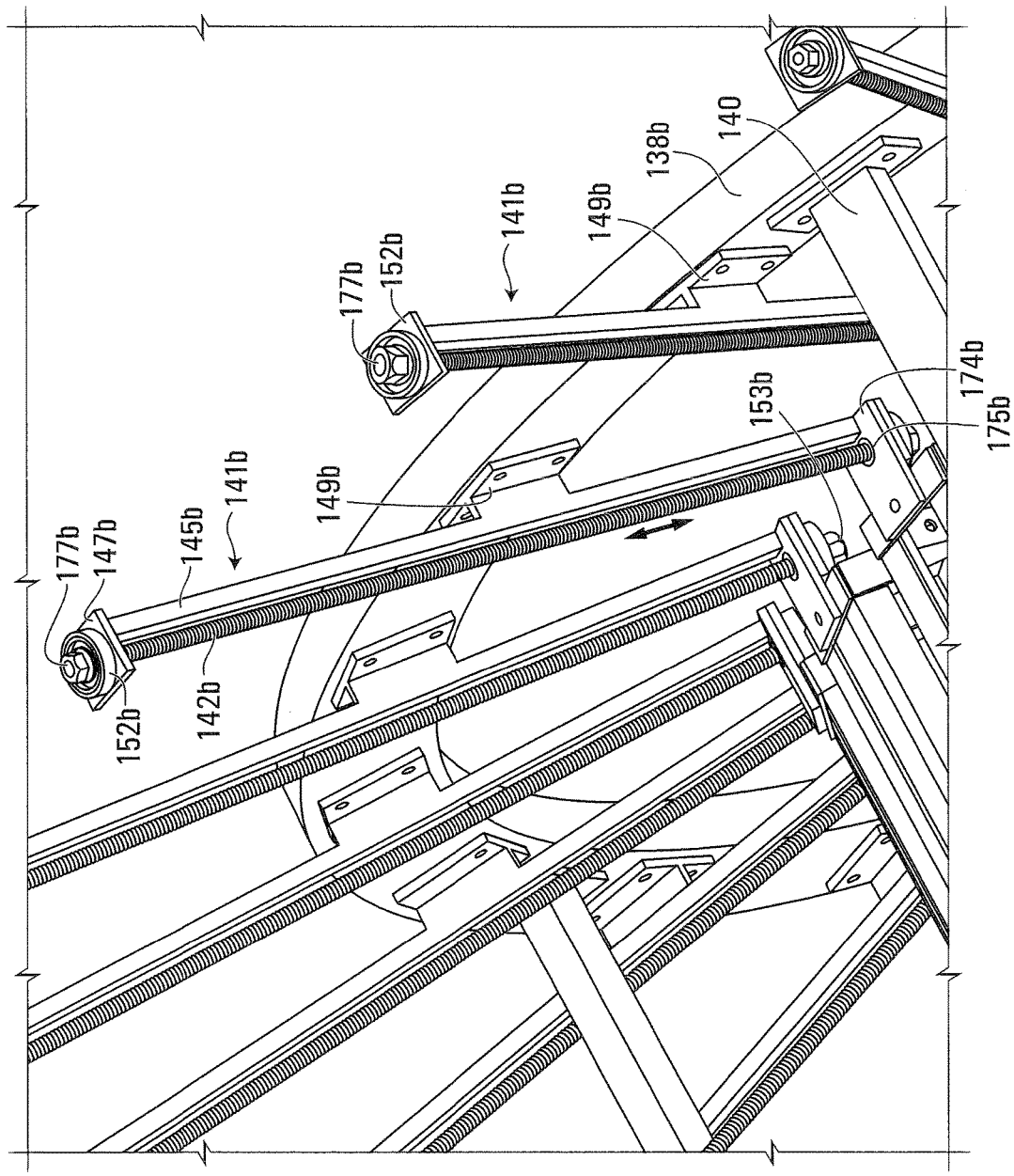
FIG. 9 is an enlarged perspective view of a portion marked 9 in FIG. 1, of the growing apparatus of FIG. 1.

With particular reference now to FIGS. 8 and 9, each of the retaining components 104 may be supported by retaining component support 106. Retaining component support 106 may provide support for each retaining component 104 and may include pairs of elongated, generally radially oriented, support devices 141a, 141b, positioned at opposite longitudinal ends of each retaining component 104. Support devices 141a, 141b may each include respective radially extending and oriented support beams 145a, 145b, that support radially oriented and elongated screwed rod members 142a, 142b. Support beams 145a, 145b and rods 142a, 142b may be made from any suitable material(s) such as by way of example only aluminum, stainless steel, plastic, mild steel. Rod members 142a, 142b may be generally cylindrical rods and be threaded on their outer surfaces.

Each support beam 145a, 145b may have at, or proximate, a radially outward end, a respective outer end plate 147a, 147b to which may be fixedly attached a bearing device 152a, 152b that allows respective rods 142a, 142b to freely rotate therein. At an opposite radially inward end, each support beam 145a, 145b may have at or proximate a radially inward end, a respective inner end plate 150a, 150b which provides support for and opposite end of each respective screwed rod 142a, 142b. To each radially inner end plate 150a, 150b is fixedly attached another bearing device 172a, 172b that also allows respective rods 142a, 142b to freely rotate therein. Thus rods 142a, 142b are supported and mounted for free rotation about their longitudinal axes, by respective opposite end plates 147a, 147b and 150a, 150b and their respective bearing devices 152a, 152b and 172a, 172b. Rods 142a, 142b may also be fixedly connected to respective opposed end nuts 176a, 177a, and 176b, 177b at each end thereof. Nuts 176a, 177a, and 176b, 177b maintain the rods 142a, 142b in a substantially fixed axial position between respective opposite end plates 147a, 147b and 150a, 150b so that rods 142a, 142b may rotate about their own longitudinal axes without moving axially themselves.

Connector plates 174a, 174b may also be provided and be connected to respective proximately located side plate members 153 of each retaining component 104 at or proximate each end of retaining component 104. Connector plates 174a, 174b may also have threaded apertures 175a, 175b (FIGS. 8 and 9) through which respective threaded rods 142a, 142b are received. Thus, through connector plates 174a, 174b, retaining components 104 may be supported at each end on rods 142a, 142b. But as rods 142a, 142b are fixedly connected to respective opposed nuts 176a, 177a, and 176b, 177b, by for example, rotating end nuts 177a, 177b, respective rods 142a, 142b may be rotated. When each rod 142a, 142b is rotated this will cause the threaded engagement of threads on rods 142a, 142b, to engage with threads in the apertures 175a, 175b in connector plates 174a, 174b and thus cause the connector plates 174a, 174b to move axially along rods 142a, 142b, in a radial inward or outward direction relative to axis X and light emitting source 102, depending upon whether there is a clockwise or counter-clockwise direction of rotation of rods 142a, 142b and which direction the threads are oriented. It will be noted from FIG. 9 in particular, that connector plates 174b (and similarly connector plates 174a on the opposite side) can slide relative to support beams 145b (and support beams 145a on the opposite side), and slide past wheel mounting plates 149b/149a, in part due to cut-out portions of connector plates 174b/174a that surround exterior surfaces of support beams 145b/145a.

Returning to FIGS. 1 and 2, plant rotating assembly 103 and in particular retaining component support 106 may also include a generally cylindrical, rotatable support structure, which may be generally circular in transverse cross section or may be polygonal in transverse cross section. For example, as shown, retaining component support include first, generally circular, wheel member 138a, and a second, generally circular, wheel member 138b that may be longitudinally spaced from first wheel 138a. In a preferred embodiment, wheel members 138a, 138b, may be generally circular in shape. In other embodiments, the wheel members may be non-circular. First and second wheel members 138a, 138b may be oriented generally transversely and parallel to each other. First and second wheel members 138a, 138b may be made from any suitable material(s) such as by way of example only aluminum, stainless steel, plastic, mild steel. First wheel member 138a may, through wheel mounting plates 149a, be interconnected to, and support, each of the plurality of support devices 141a, including their respective rods 142a. Similarly second wheel member 138b may through wheel mounting plates 149b, be interconnected to, and support, each of the plurality of support devices 141 b including their respective rods 142b. The diameter of wheel members 138a, 138b may be selected to provide for a suitable height at which the plant rotation assembly 103 is held above the ground.

Wheel members 138a, 138b may be connected together by a plurality of longitudinally oriented cross-members 140 that may be angularly spaced around longitudinal axis X. Cross members 140 may made from any suitable material(s) such as by way of example only aluminum, stainless steel, plastic, mild steel.

The result of this combined physical structure is that retaining components 104, interconnected to wheels 138a, 138b through support devices 141a, 141b including their respective rods 142a, 142b, together with cross-members 140 may form a generally cylindrical or spool-like plant rotating assembly 103. Wheels 138a, 138b, being part of the retaining component support mechanism 106 may also co-operate with rotation mechanism 108 to enable plant rotating assembly 103 to be rotated about longitudinal axis X by the rotation mechanism 108 and rotational drive mechanism 114.

Rotation mechanism 108 may include rollers 198a, 199a to support for rotation and engage with circumferential edge surfaces of wheel 138a. Similarly rotation mechanism 108 may include rollers 198b, 199b to support for rotation and engage with circumferential edge surfaces of wheel 138b. Circumferential edge surfaces of wheel member 138a, 138b may be provided with a material suitable to ensure frictional engagement such as no-slip paints with the rollers 198a, 198b, 199a, 199b. Roller 198a may have a shaft supported for free rotation in a bearing 240a. Bearing 240a may be supported between top portions of support members 122a, 126a. Roller 199a may have a shaft supported for free rotation in a bearing 241a. Bearing 240a may be supported between top portions of support members 123a, 127a. Similarly, roller 198b may have a shaft supported for free rotation in a bearing 240b. Bearing 240b may be supported between top portions of support members 122b, 126b. Roller 199b may have a shaft supported for free rotation in a bearing 241b. Bearing 240b may be supported between top portions of support members 123b, 127b.

Rotational mechanism 108 may also include a rotational drive 114 which may be operable to engage one or more of rollers 198a, 198b, 199a, 199b to drive the rollers in rotation. As a result of the engagement of the one or more rollers 198a, 198b, 199a, 199b with circumferential edges of one or both wheels 138a, 138b, the rotation of such one or more rollers by rotational drive 114 can cause wheels 138a, 138b to rotate about axis X and light emitting source 102, thus driving the rotation of plant rotational assembly 103 as a whole.

With particular reference to FIG. 2, in the illustrated example embodiment, rotational drive 108 may include a drive motor 246 which may be an AC Baldor brake motor 0.5 hp model CEWDBM3538 with gear reduction. Drive motor 246 may have a drive shaft 247 that connects to a first drive wheel 248. Drive wheel 248 may be interconnected by an endless continuous drive belt 252 to a second drive wheel 253. Second drive wheel 253 is mounted on a common shaft to third drive wheel 254 which may be interconnected by an endless continuous drive belt 259 to a final drive wheel 259. Drive wheel 259 may be mounted on a common drive shaft with roller 199a and thus roller 199a may rotate when drive wheel 259 is rotated as a result of the operation of motor 246.

Drive motor 246 may be linked to, and controlled by, PLC 107 and may have an encoder associated therewith so that PLC 107 may monitor and control the rotation of the drive shaft 247 of the motor 246 and thus the angular position of wheel 138a relative to longitudinal axis X. In this way PLC 107 can control the rotation of plant rotation assembly 103 and the retaining components 104 and can, if and when required, stop the rotation of each retaining component 104 at an angular position that may be desired in order for each retaining component 104 and its respective retaining component support mechanism to be engaged by the position adjustment mechanism 110 and/or the fluid dispensing apparatus 188, as described hereinafter.

In other embodiment, pinch rollers may be mounted adjacent rollers 198a, 198b, 199a, 199b exteriorly of, and in contact with, the wheels 138a, 138b to prevent the device from slipping off the support frame 112 during rotation. In further embodiments, rotational drive 114 may comprise alternate drive systems such as chains, gears and wheels may be used for the rotation of plant rotation assembly 103 where those drive systems are powered by some kind of motor.

In other embodiments, an alternate rotational drive may be provided to rotate the plant rotating assembly 103.

Figure 6:
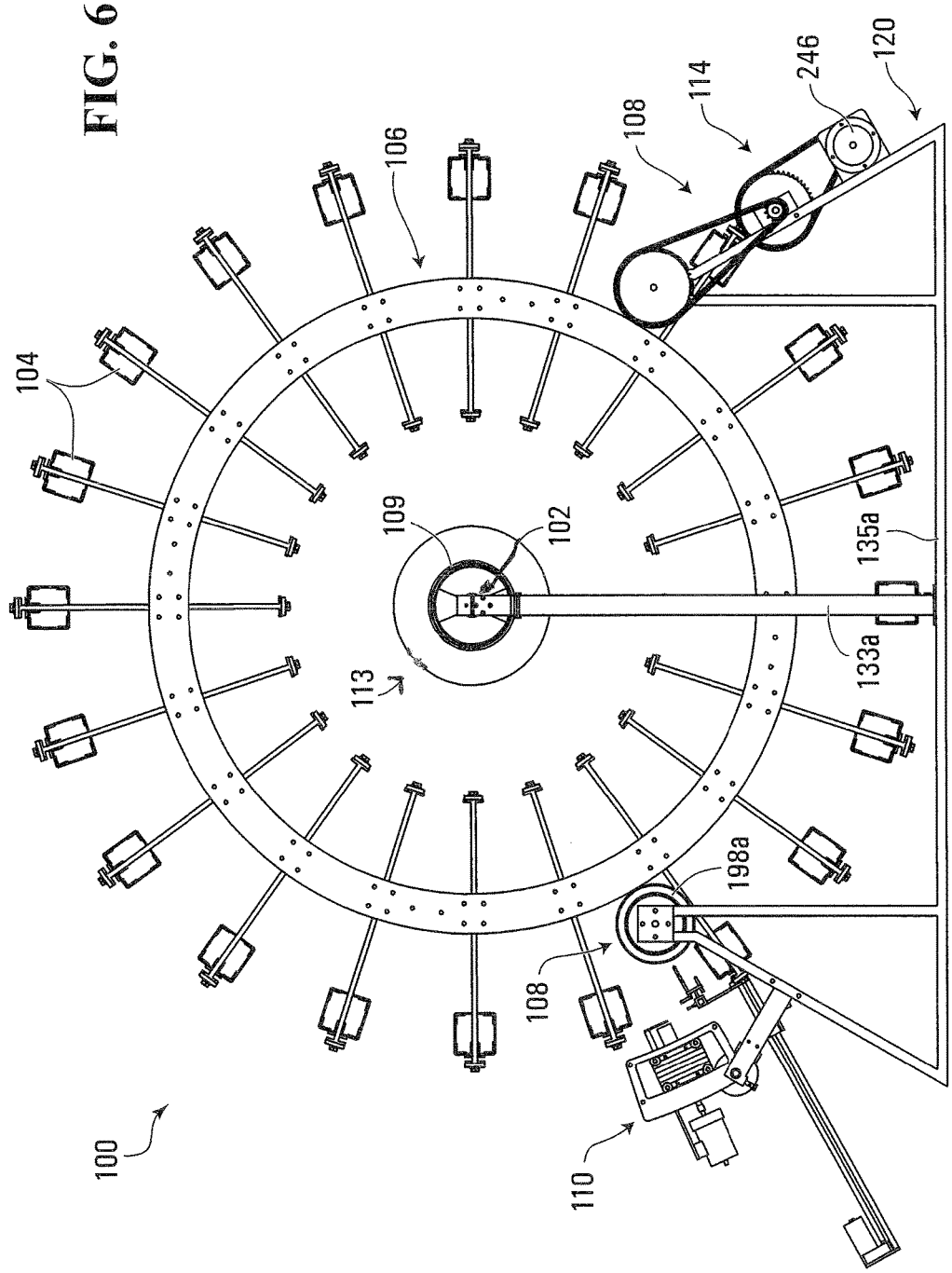
FIG. 6 is a front elevation view similar to of FIG. 2, but with retaining components positioned in fully radially outward positions.

Returning to features of retaining components 104, they may each be movable towards and away from the light emitting source 102. In some embodiments, where light emitting source 102 is aligned with axis X, the retaining components are movable along radial paths towards and away from longitudinal axis X. This may be achieved by the simultaneous rotation of the respective rods 142a, 142b of a particular retaining component 104 to move the retaining component to any radial position between a fully outward radial position (eg. FIG. 6) and a fully inward radial position (FIG. 2). The radial position of each retaining component 104 may thus be independently, and infinitely, adjusted to any position between a fully inward position and a fully outward radial position.

When rotational movement is applied to an operational pair of rods 142a, 142b, coupled to a specific retaining component 104, by a rotating coupling device (such as rotating coupling devices generally designated 158a, 158b (FIGS. 1, 3 and 4), rods 142a, 142b may be rotated, thus moving threaded plates 174a, 174b, along predetermined radial linear trajectories defined by the orientation of rods 142a, 142b, and carrying with them their respective retaining components 104. Selectively moving each pair of connector plates 174a, 174b (carrying with them their respective retaining component 104) may thus guide the retaining components 104, and plants held therein, in linear paths toward and away from light emitting source 102 and preferably move along radial trajectories outwardly from, and inwardly to, longitudinal axis X.

As shown in FIGS. 3 and 4, a rotating coupling device assembly 159 may include a pair of longitudinally (relative to axis X) rotating coupling devices 158a, 158b that may be provided at or proximate longitudinally opposite ends of a longitudinally extending cross member 154. Cross member 154 may be connected with a suitable attachment mechanism to opposed stand assemblies 120a, 120b that form part of support frame 112 such as with bolts (not shown) that may pass through bolt holes 179a, 179b respectively. Rotating coupling device assembly 159 may also include a pair of spaced elongated support plates 194a, 194b proximate each end of cross member 154 and which extend generally away from support members 122a, 122b and from cross member 154 to provide supports for rotating coupling devices 158a, 158b respectively.

Rotating coupling device 158a may be mounted between support plates 194a. Rotating coupling device 158b may be mounted between support plates 194b. Extending longitudinally, generally parallel to cross member 154, between support plates 194a and support plates 194b, is a pivot rod 195, which may be hexagonal shape in cross section. Pivot rod 195 may be mounted for pivoting rotation about its longitudinal axis that may be substantially parallel to axis X. Coupling devices 158a, 158b are interconnected to pivot rod 195 and may pivot about the axis of pivot rod 195 relative to and supported by support plates 194a, 194b respectively. At one end of pivot rod 195, also supported by and interconnected to support plates 194b, is an assembly rotating motor 190 (such as a servo drive motor) that may be linked to, and controlled by, PLC 107. A drive shaft of motor 190 may be interconnected to the proximate end of pivot rod 195. An encoder (not shown) may be associated with motor 190 so that PLC may monitor and control the rotation of the drive shaft of the motor 190 and thus the angular position of pivot rod 195.

Rotating coupling devices 158a, 158b may be constructed in the same or a substantially similar manner to each other. Each rotating coupling device 158a, 158b may include a support housing 193a, 193b which supports actuator motors 156a, 156b, respectively. A spring mechanism (not shown) between respective housings 193a, 193b may be provided to allow the actuator motors 156a, 156b some small amount of movement along one axis, or preferably two axes (each perpendicular to each other and to the direction of the axes of the drive shafts) relative to their housings. This may accommodate potential misalignment and intolerance of the actuator motors 156a, 156b, their shaft 157a, 157b with the nuts 177a, 177b of rods 142a, 142b during the coupling action. Each support housing 193a, 193b may be fixedly connected to pivot rod 195 and pivot about the axis of pivot rod 195 with pivot rod 195 when assembly rotating motor is actuated.

With reference now to FIGS. 3, 4, 13-16, each support housing 193a, 193b contains a movable shuttle device 266 which may move vertically (ie. in a direction orthogonal to the transverse and longitudinal directions of shuttle device 266) within housing 193a, 193b. Hereinafter, only housing 193a and its shuttle device 266 are described in detail, but housing 193b and its shuttle device 266 may be constructed in a substantially similar or identical manner.

Figure 15:
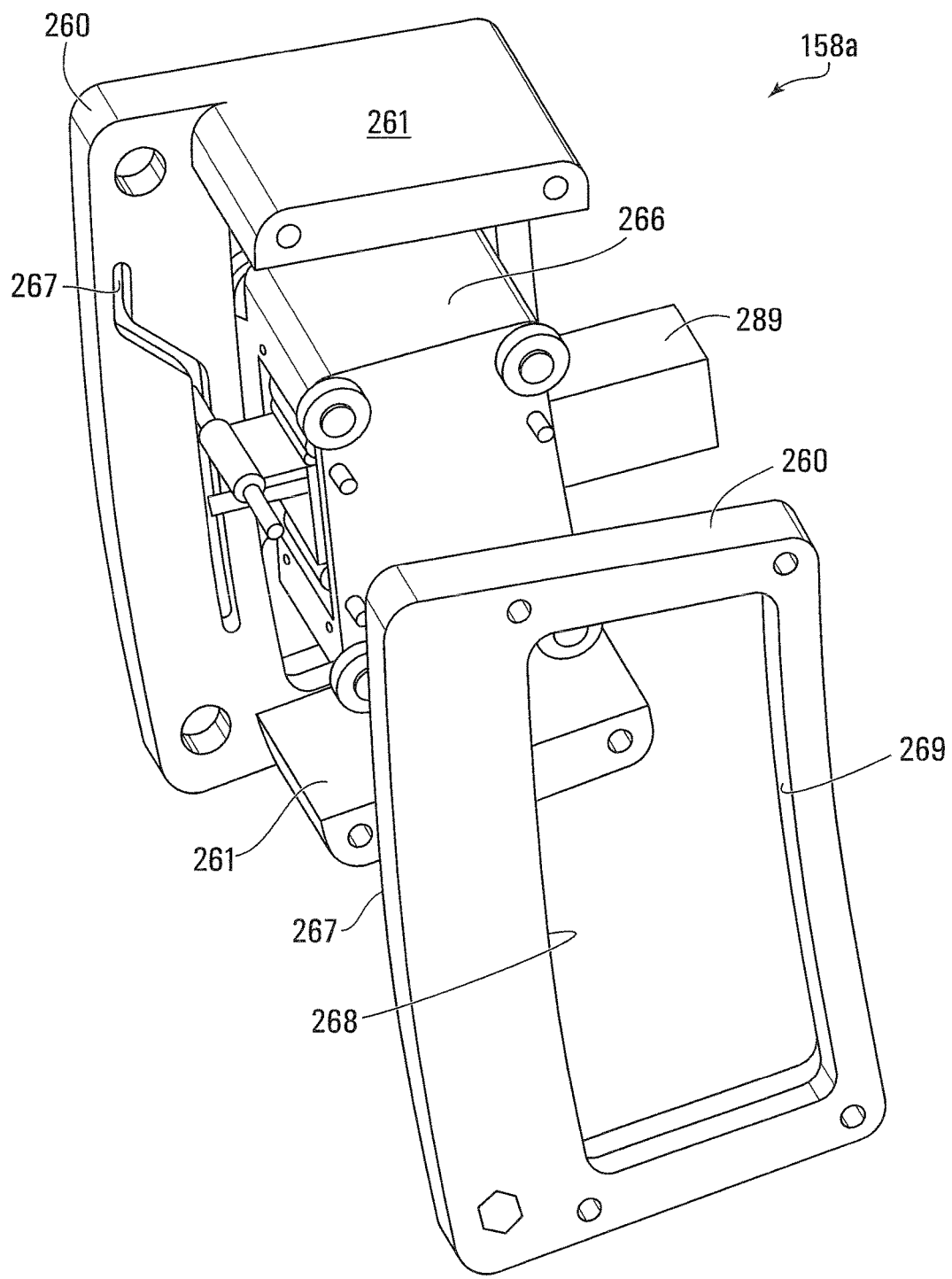
FIG. 15 is an exploded view of part of the apparatus of FIG. 1.
Figure 16:
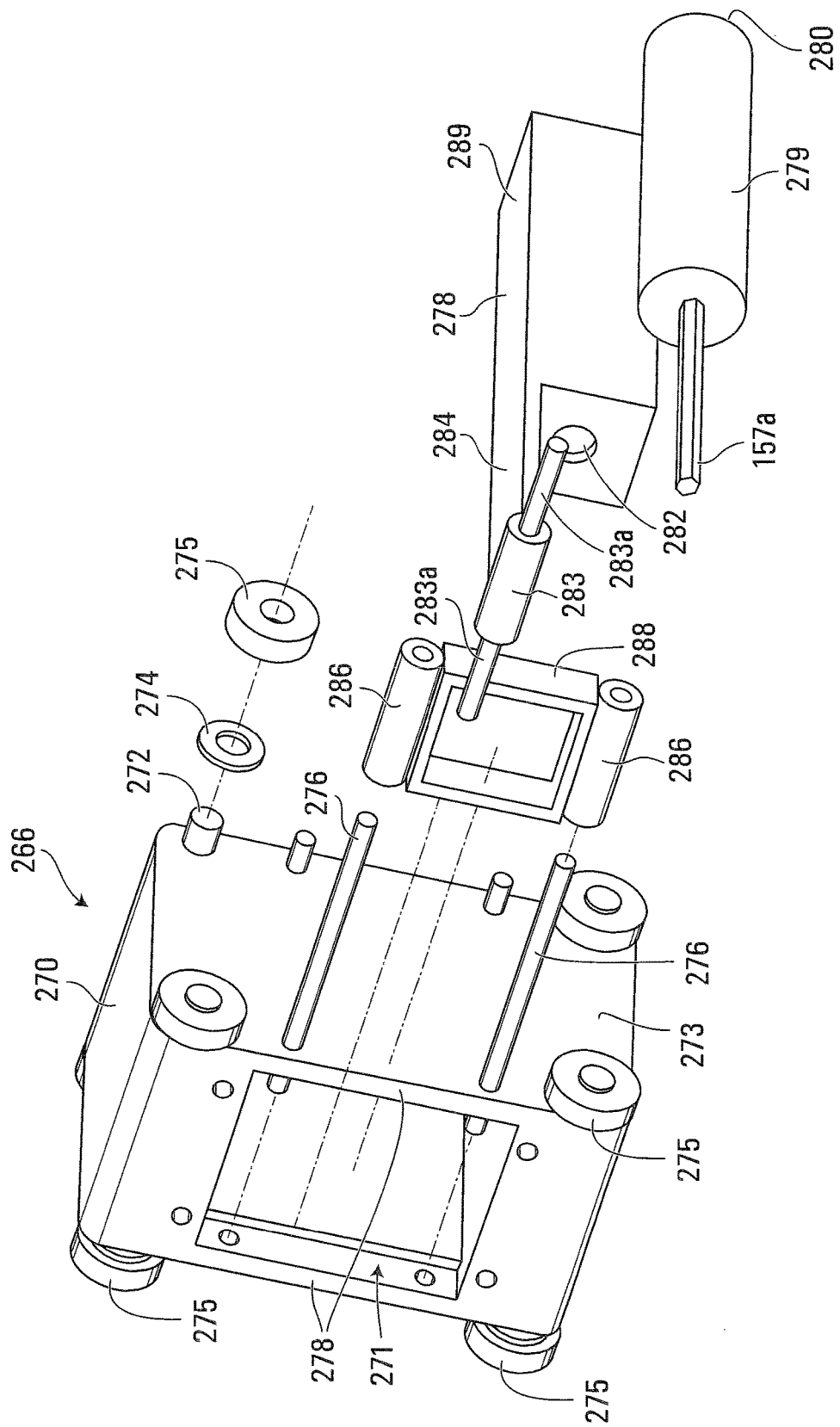
FIG. 16 is an exploded view of part of the apparatus shown in FIGS. 13 and 14.

Housing 193a may have a pair of opposed parallel side wall plates 260 (FIG. 15). Side wall plates 260 may be joined at upper and lower edges by opposed, parallel upper and lower plates 261. Each side wall plate 260 may be provided with an inward facing, vertically extending cam track slot 267 that provide complimentary cam tracks on each side of shuttle device 266. Each side wall plate 260 may also be provided with a rectangular shaped opening having opposed vertically and transversely extending inside edge surfaces that provide opposed rail guides 268, 269.

Each shuttle device 266 may be formed as a generally cuboid shaped block 270 having an aperture 271 passing longitudinally there through. Aperture 271 may be generally rectangular in vertical and transverse cross-section. Longitudinally and vertically extending outer side surfaces 273 of side plates 278 of block 270 may be provided with shafts 272 proximate each of their four corners of the side surfaces. Shafts 272 have rotationally mounted thereto wheels 275 and spacers 274. In operation, wheels 275 may engage respective guide rails 268 and 269 of housing side wall plates 260 to permit limited vertical movement of shuttle device 266 relative to housing 193a.

Each shuttle device 266 is also provided with a pair of rear, transversely oriented and vertically spaced rollers axles 276 which have opposed end portions that are mounted in apertures in vertically and transversely oriented side plates 278. Roller axles 276 support cylinders 286 for movement along the roller axles 276. Similarly, each shuttle device 266 is also provided with a pair of front, transversely oriented, and vertically spaced roller axles 277 which have opposed ends portions that are also mounted for rotation in apertures in vertically and transversely oriented side plates 278. Roller axles 277 support cylinders 287 for movement along the roller axles 277. Front cylinders pairs 287 and rear roller pairs 286 are spaced vertically from each other.

Each shuttle device 266 also has a socket support block 289 which has a generally cylindrical shaped aperture 282. Socket support block 278 also has a rearward extending extension plate 284 which is interconnected to a cam follower housing 283.

A socket shaft 279 carrying an outwardly positioned socket 280 is rotatably received within aperture 282. Socket shaft 297 is fixedly secured to drive motor shaft 157a (of actuator motor 156a) and interconnected socket 280, such that drive shaft 157a, socket shaft 279 and socket 280 can rotate about a longitudinal axis of, and within, the cylindrical aperture 282. A rear end of socket shaft 279 may be connected to the drive shaft 281 of a motor 156a (not shown in FIGS. 13-16). Drive motor 156a is thus mounted to the shuttle device 266 through socket shaft 279 and socket support block 289. Thus when motor 156a is operated, socket 280 can rotate in both directions about the longitudinal axis of the cylindrical aperture (internal bore) 282. Socket support block 289 may be received within longitudinal aperture 271 and can be supported between front cylinder pairs 287 and rear cylinder pairs 286 which are spaced vertically from each other. A square frame member 288 is fixedly positioned to surround the outer surfaces of socket support block 289. Frame member 288 supports and contains in two axes the socket support block 289.

Socket support block 289 (carrying socket shaft 279, socket 280, motor drive shaft 157a and motor 156a (FIG. 3) moves up and down within square frame member 288. This movement is caused by cam followers 283a following the cam tracks 267 in the inward facing surfaces of oppose housing side plates 260.

Cam follower housing 283 supports for longitunal movement a shaft with opposed first and second shaft portions 283a which allows socket support block 289 to move forwards and backwards along 283a longitudinal axes which is receive in vertical cam tracks 267. It will be appreciated that by virtue of the interconnection of cam tracks 267, with cam follower shaft portions 283a and the interconnection of cam follower 283 with socket support block 289 and socket shaft 279, as shuttle 266 moves vertically downward in housing 193a, the cam track/cam follower interaction will move socket support block 289, socket shaft 279, drive motor shaft 157a, and motor 156a, forward longitudinally, being supported for longitudinal movement on rear cylinders 286 and front cylinders 287.

Similarly, as shuttle 266 moves vertically upward in housing 193a, the cam track/cam follower interaction will move cam support block 278, socket shaft 279 and drive motor shaft 157a, with motor 156a, rearward longitudinally, being supported for longitudinal movement on rear cylinders 286 and front cylinders 287.

With reference to FIG. 3, a generally triangular V-shaped stirrup 262 may be provided on a rod extending from a front face of shuttle device 266 (not shown in FIGS. 13-16) to align socket 280 with mechanical actuator coupling end nuts 176a or 176b.

In operation of apparatus 100, when it is desired to adjust the position of a particular retaining component 104, PLC 107 causes first motor 190 to be operated to rotate rotary coupling devices 158a, 158b to a suitable engagement position. Then PLC 107 causes respective support devices 141a, 141b to be rotated with rotation mechanism 108 to bring the end nuts 177a,177b into engagement with stirrups 266a, 266b of shuttle devices 266 in respective housings 193a, 193b. This engagement of ends nuts 177a, 177b causes shuttle devices 266 to move vertically upwards in unison. By virtue of the interconnection of cam tracks 267, with cam follower shaft end portions 283a and the interconnection of cam follower 283 with socket support block 289 and socket shaft 279, as shuttle 266 moves vertically downward in housing 193a, the cam track/cam follower interaction will move cam support block 278, socket shaft 279 and drive motor shaft 281 forward longitudinally, being supported for longitudinal movement on rear cylinders 286 and front cylinders 287. This then causes sockets 280 to be able to engage with end nuts 177a, 177b. This then allows motors 156a, 156b to be operated under the control of PLC 107 to rotate sockets 289 causing end nuts 177a, 177b to be rotated which causes their respective rods 142a, 142b, to be rotated (either clockwise or counter-clockwise) to thereby adjust the radial position of the retaining component 104.

Actuator motors 156a, 156b may be any suitable actuator drive motor and may be servo drive motors that are each linked to and separately controlled by PLC 107. An encoder (not shown) may be associated with each motor 156a, 156b so that PLC may monitor and control the rotation of the drive shafts of each of the motors and thus the amount of rotation of their drive shafts. For example, motors 156a, 156b may be AC Brushless Servo BSM100C-1150AA T'STAT, RESOLVER motors made by Baldor. Motors 156a, 156b may have rotating drive shafts 281, with sockets secured to the respective ends thereof and may be configured and operable to engage the end nuts 177a, 177b of rod members 142a, 142b. When end rods 142a, 142b are rotated to a suitable angular position around axis X, and motors 156a, 156b are appropriately angularly positioned by rotation of pivot rod 195 and the corresponding pivoting of support housings 193a, 193b, drive shafts 157a, 157b may be operable and positioned to simultaneously engage and couple with end nuts 177a, 177b of each respective threaded rods 142a, 142b. The rotational movement provided by drive shafts 157a, 157b of motors 156a, 156b, and controlled by PLC 107, rotates rods 142a, 142b respectively causing the respective pair of connector plates 174a, 174b of a retaining component 104 to move linearly and radially outwardly and/or inwardly along rods 142a,142b. This movement of connector plates 174a, 174b due to the rotation of rods 142a, 142b causes retaining components 104 to move in a linear and radial path relative to longitudinal axis X and light emitting source 102. The amount of movement provided can be determined based on the particular needs of the plants growing in the particular retaining component 104 at a particular time/in a particular time period. In this way the distance between retaining components 104 and the plants contained therein, and the central light emitting source 102 can be individually selected and may be optimized easily and automatically so that the plants in a particular retaining component 104 may achieve the optimal light intensity/amount of light energy from light emitting source 102.

Figure 5:
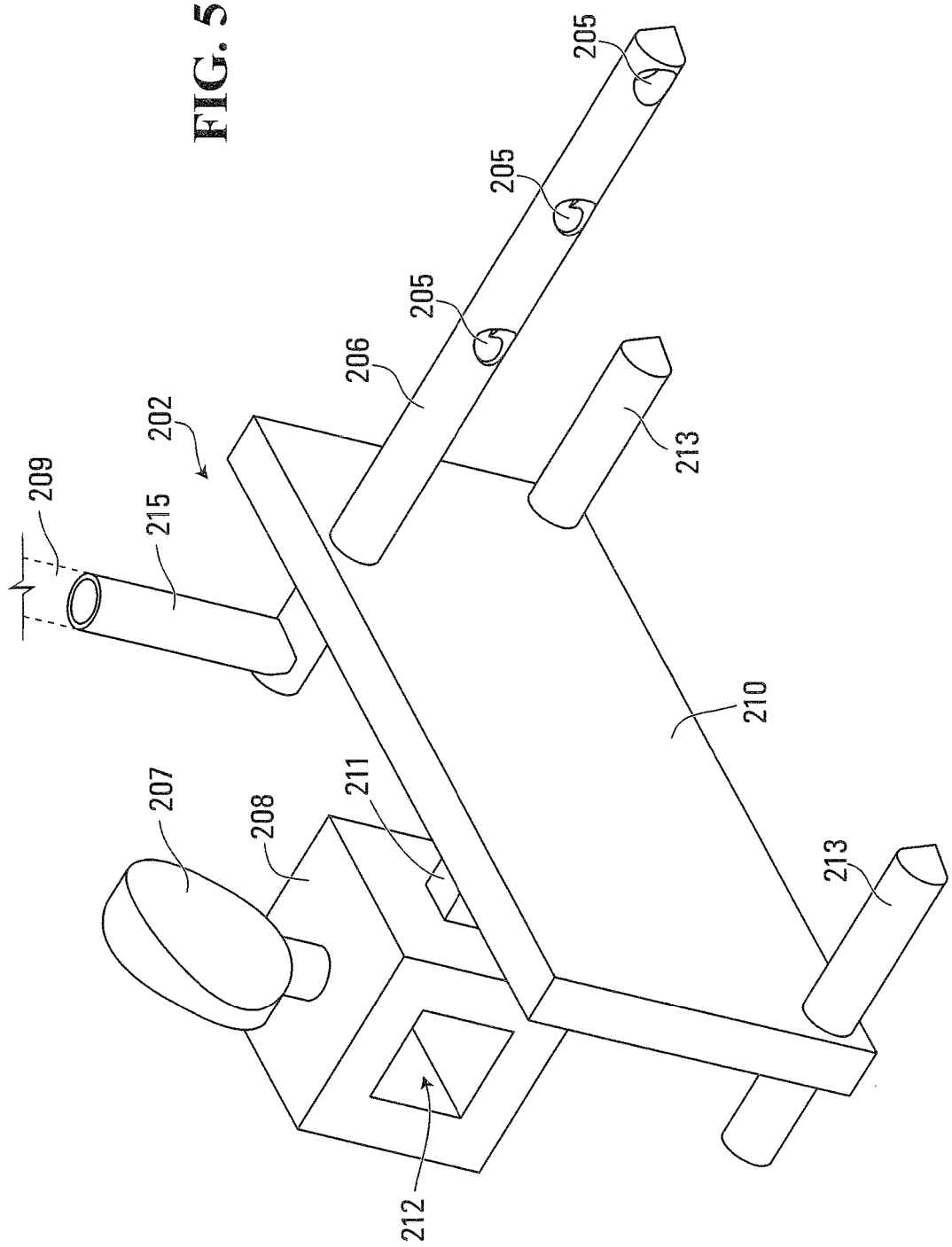
FIG. 5 is a perspective view of part of the rotary plant growing apparatus of FIG. 1.
Figure 10:
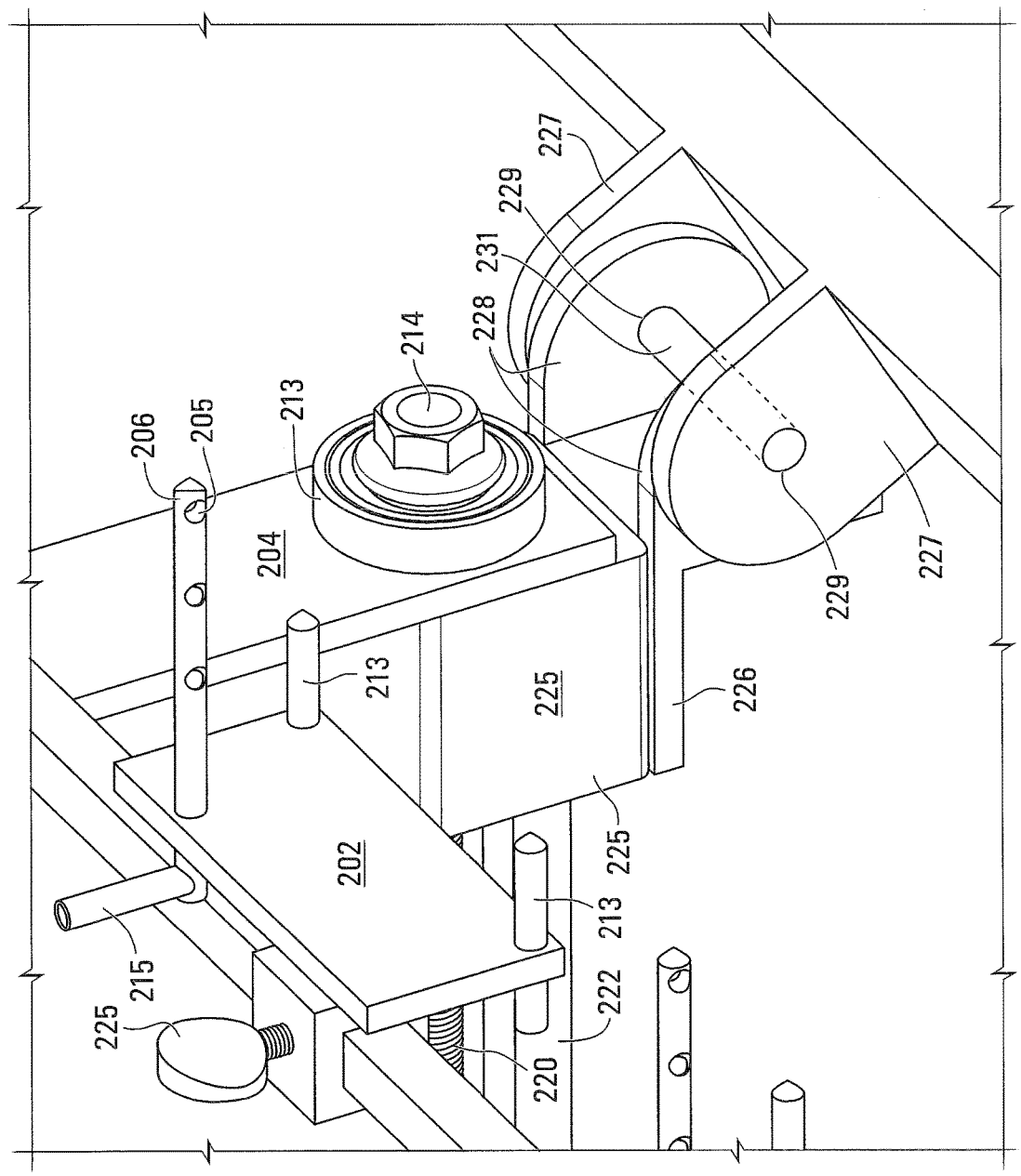
FIG. 10 is an enlarged perspective view of a portion marked 10 in FIG. 3, of the growing apparatus of FIG. 1.
Figure 11:
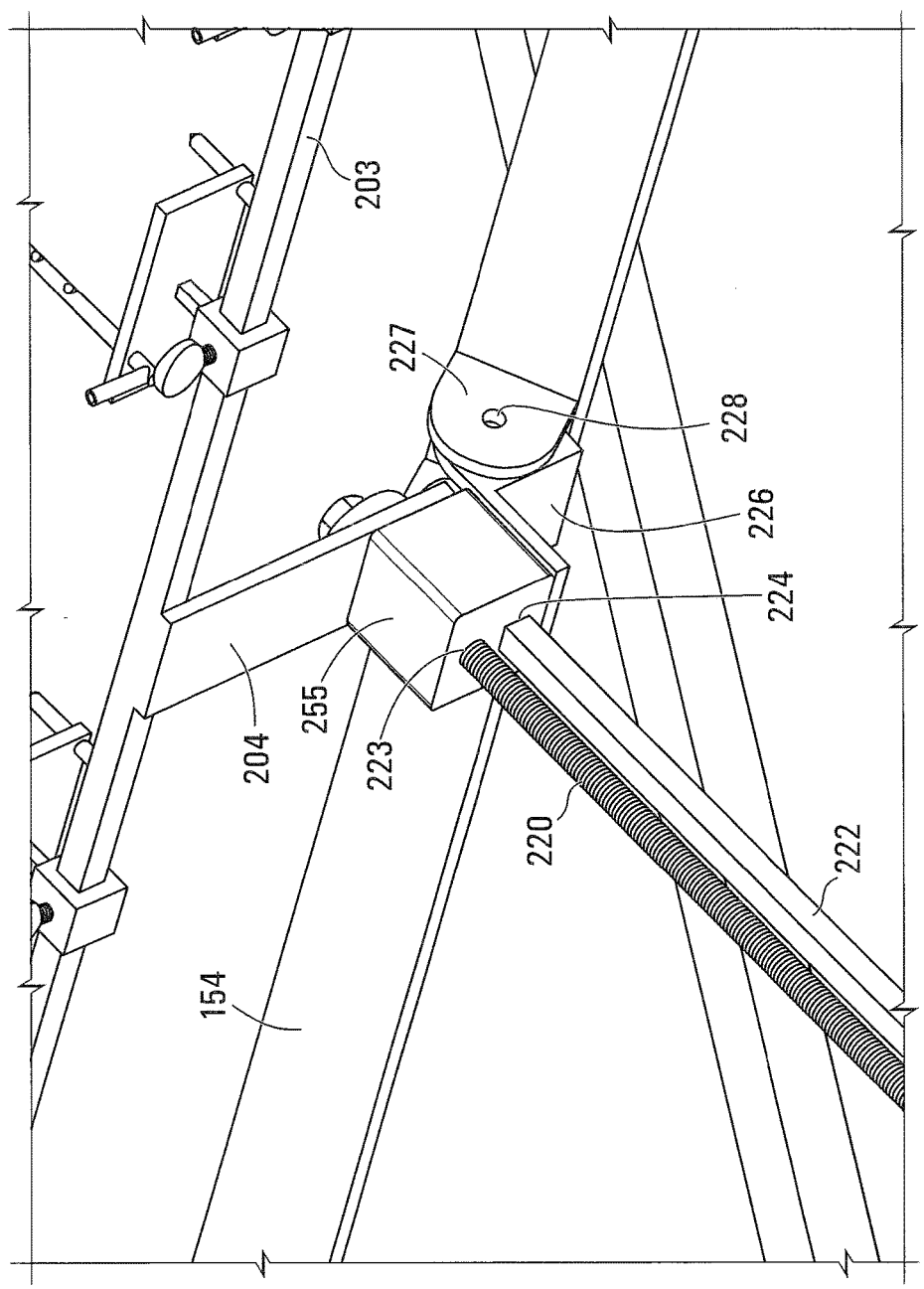
FIG. 11 is an opposite side perspective view to that of FIG. 10, of substantially the same general portion marked 10 in FIG. 3, of the growing apparatus of FIG. 1.
Figure 12:
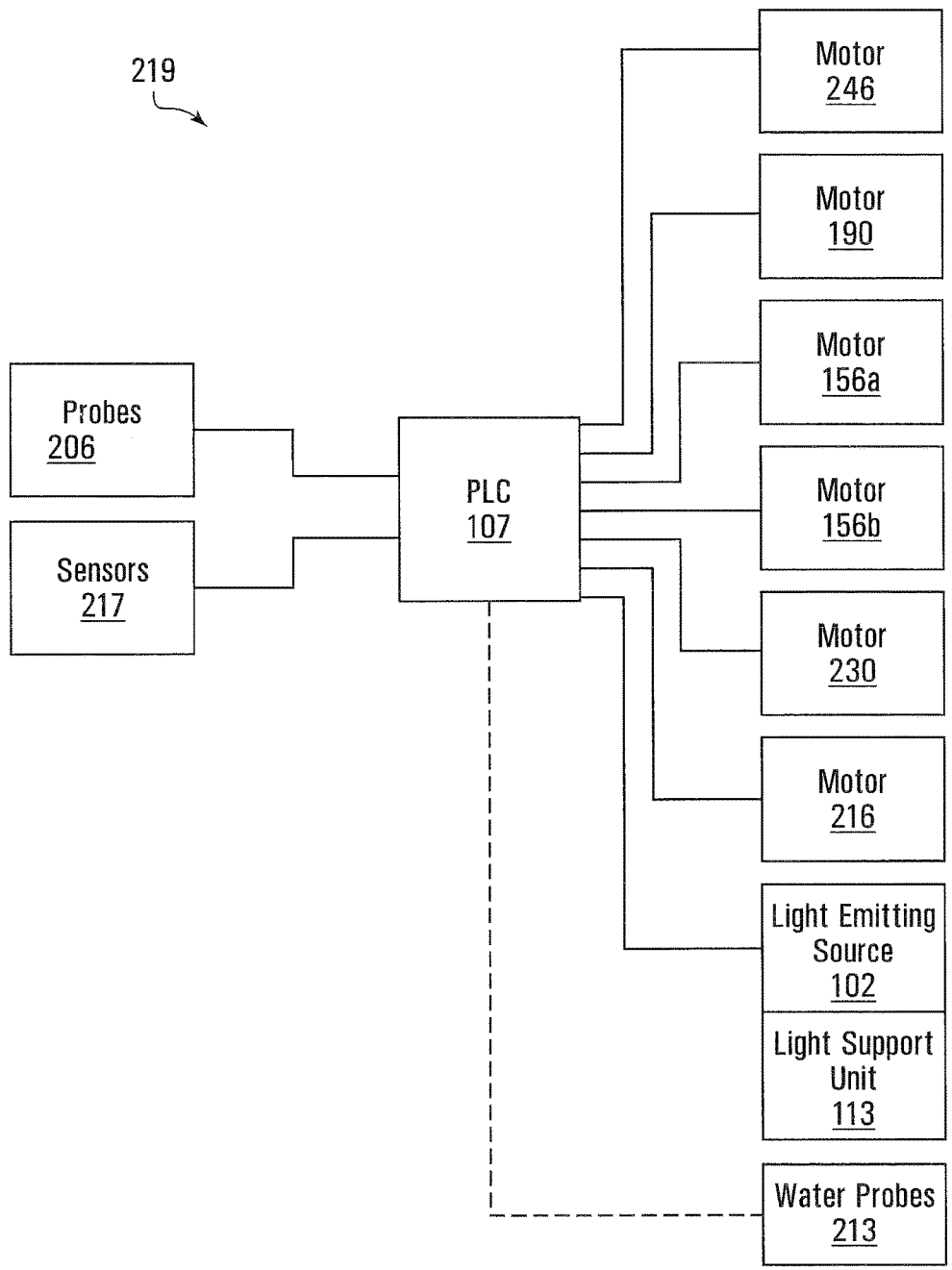
FIG. 12 is a schematic view of a system for controlling the plant growing apparatus of FIG. 1.
Figure 13:
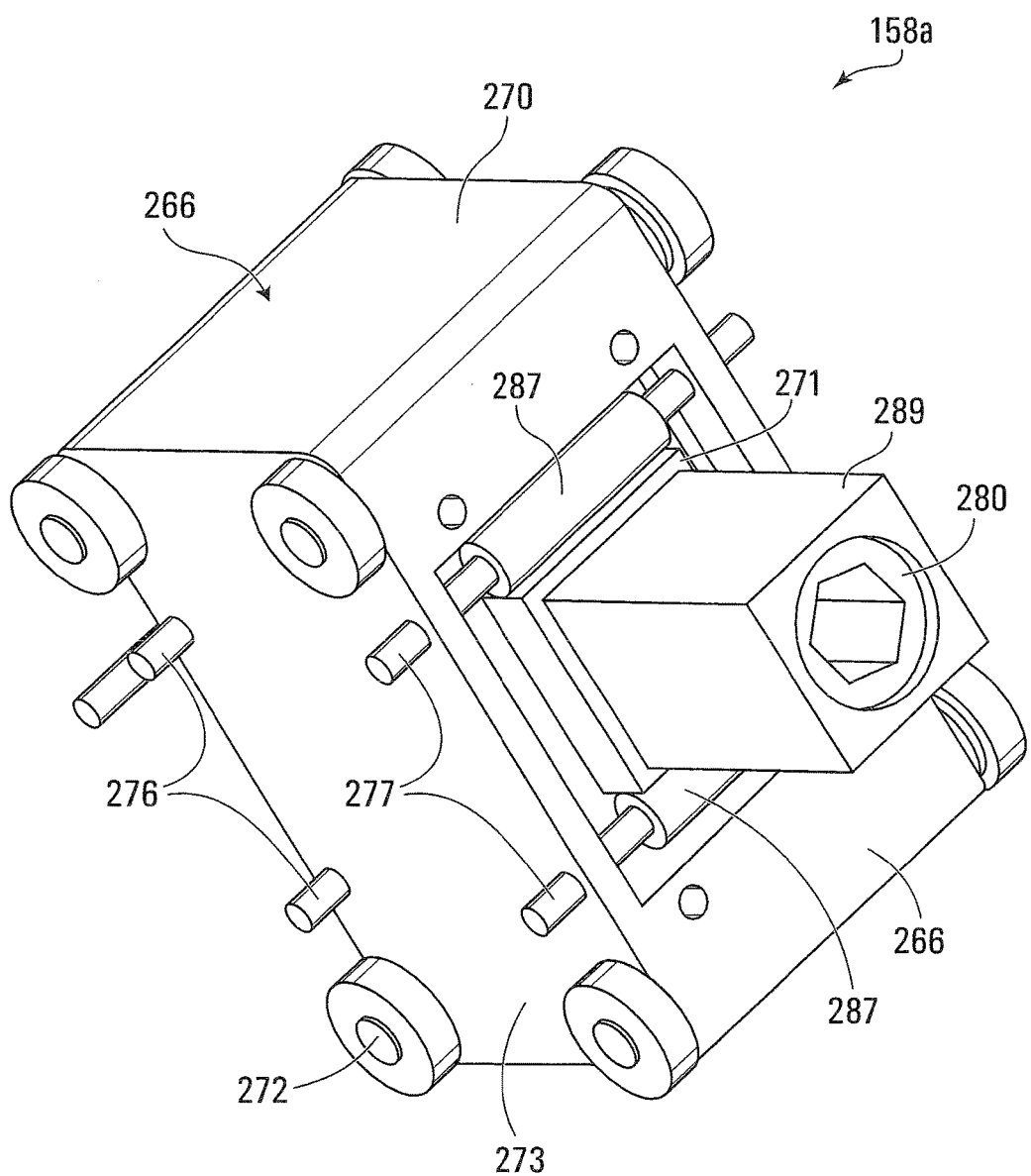
FIG. 13 is a front perspective view of part of the apparatus of FIG. 1.
Figure 14:
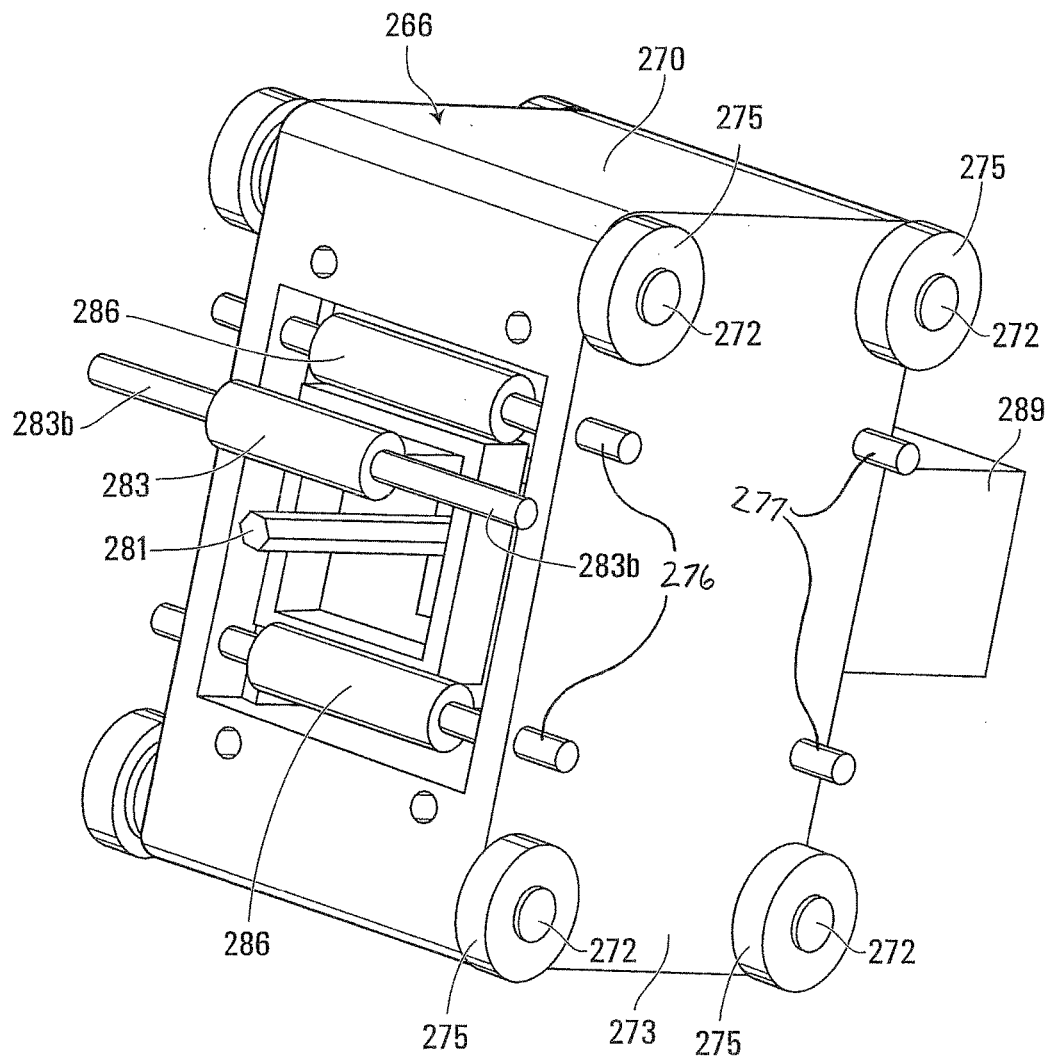
FIG. 14 is a rear perspective view of part of the apparatus of FIG. 1.

Also as shown in FIG. 3 and also FIGS. 5, 10 and 11, mounted to cross member 154 may be an adjustable dispensing assembly 200 that may be operable to dispense water and/or nutrients, particularly liquid nutrients. Dispensing assembly 200 may include a longitudinally oriented support arm member 203 to which may be mounted a plurality of longitudinally spaced dispensing modules 202 (see FIG. 5). The number and spacing of dispensing modules 202 can be selected depending upon the particular needs of the particular plants and numbers thereof in the retaining components 104. Each of dispensing modules 202 may have hoses 209 (shown in dotted outline in FIG. 5) connected to a separate input port to supply each module 202 with a liquid nutrient and/or water that may be emitted from apertures 205 of a hollow tubular probe 206 of each dispensing module 202. Liquid nutrient/water may be supplied through hoses 209 from a source of such liquid (such as a tank containing liquid), driven by a suitable pump device 216 (FIG. 12). The pump 216 and/or liquid source may be mounted to support frame 112 or may be positioned away from support frame 112. The operation of pump may be controlled by PLC 107 such that liquid nutrient/water may be emitted from each of the probes 206 at appropriate times when the probes are appropriately positioned relative to the retaining components 104. In some embodiments, each module 202 has been independently supplied with its own metered amount/type of water/liquid nutrient.

Probes 213 may also be provided that contain one or more sensors that may be used for detecting one or more characteristics of the plant or the plant growing media in each retaining component 104 when brought into the vicinity of, or contact with the probes. The sensors on probes 213 may be in communication with PLC 107 and be operable to ascertain/verify one or more individual plant media variables such as for example the level of total dissolved solids (TDS), moisture content, pH, temperature. The information obtained by probes 213 and be used by PLC 107 to determine the appropriate nutrient/water/pH dosing (or any other variable) requirements of each plants.

Referring to FIG. 12, a system 219 for controlling a plant growing apparatus in accordance with one embodiment is shown at 219. System 219 includes PLC 107. System 219 also includes probes 206 and 213, sensors 217, drive motor 246, assembly rotating motor 190, actuator motors 156a and 156b, linear actuating motor 230, and pump 216, all of which are in communication with PLC 107. PLC 107 may be configured to receive signals representing system information from probes 213 and/or sensors 217 and to output signals for controlling drive motor 246, assembly rotating motor 190, actuator motors 156a and 156b, linear actuating motor 230, and/or pump 216 and or watering probe 206 volumetric flowrates based at least in part on the system information received from probes 213 and/or sensors 217. PLC 107 may in some embodiments It will be appreciated that apparatus 100 including PLC 107 allows for the real time control and operation of the adjustment of the radial position of retaining components 104 and plants held therein, as well as the real time control and operation of the dispensing assembly 200. In other words, apparatus 100 can be continuously operated under the control of PLC 107 without human intervention to adjust the radial position of retaining components 104 and dispense the appropriate level of dosing to control the level of nutrient/water/pH.

For each module 202, probes 206 and 213 are supported on a plate member 210. Extending from the rear surface of plate member 210 is a mounting block support member 211 that supports a mounting block 208 and interconnects the mounting block 208 to plate member 210. Mounting block 208 has a rectangular aperture 212 that is suitably sized to receive support arm member 203 there through. A tightening screw 207 may pass through a side of mounting block 208 to engage a surface of arm member 203 when arm member 203 is received thorough aperture 212. Thus by sliding movement (when screw 207 is not engaged with arm member 203), the longitudinal position of each nutrient/water dispensing module 202 may be adjusted. By engaging screw 207 with arm member 203 a desired position of module 202 may then be secured. Also, the release and engagement of mounting screws 207 of modules 202 allows for addition/reduction and/or replacement of multiple modules 202 on arm member 203.

Dispensing assembly 200 may also have a support plate 204 connected at a longitudinal position along and between the ends of support arm member 203, preferably near the middle area of the length of arm member 203. Support plate 204 is connected to the end of a threaded rod 220 and the end of a slide bar 222. Threaded rod 220 and slide bar 222 are both received through respective apertures 223, 224 that pass through block member 225. The end of rod 220 is received through a bearing 213 fixed to plate 204 and which allows the end of rod 220 to rotate freely relative to plate 204. A nut 214 fixedly attached at this end of rod 220 maintains bearing 213 and plate 204 axially relative to rod 220.

Block member 225 is fixedly attached to a pivotable mounting bracket 226. Mounting bracket 226 is mounted to plates 227 and is fastened and pivots about the fastener pin 231 which is placed through mounting holes 229 in mounting arms 228. Block member 225 pivots around the fastener pin 231 that goes through mounting holes 229. The pivoting connection between (a) block member 225, plate 204, arm 203 and (b) cross member 154 allows for the angular position of dispensing assembly 200 relative to rotating coupling device assembly 159 to be adjusted when setting up plant growing apparatus 100 for operation. A desired relative angular position can be selected and then fixed such as with a locking pin (not shown) at pivotable mounting bracket 226. Accordingly, in operation, a preferred relative angle between retaining components 104 and the components of adjustable dispensing assembly 200 can be achieved and maintained.

Plates 227 are fixedly connected to cross member 154. In block member 225, aperture 223 may have a threaded interior cylindrical surface that can engage with threads on the exterior cylindrical surface of rod 220. As rod 220 is rotated about its longitudinal axis, the interaction of the threads on rod 220 and threads of aperture 223 cause rod 220, slide bar 222, along with support plate 204, arm member 203 and modules 202 secured thereto, to move in an axial direction that may be towards or away from longitudinal axis X and light emitting source 102.

Rotation of rod 220 may be effected by connection at the opposite end of rod 220 to a linear actuating motor 230 which through a suitable gear mechanism 231 can engage rod 220 to effect rotation of rod 220. The rotation of rod 220 clockwise and counter-clockwise thus can move arm member 203 and modules 202 secured thereto, in an axial direction on a radial trajectory inwardly or outwardly of the center of plant rotating assembly 103, longitudinal axis X and light emitting source 103. This movement can bring a plurality of nutrient/liquid dispensing modules 202, removably into contact with the plant growing media contained within a suitably positioned retaining component 104. This movement can be effected when a retaining component 104 has been suitably angularly positioned in relation to axis X and held in such position for a period of time. The retaining component 104 is positioned inwardly of the dispensing assembly 200 and generally on the same radial trajectory as modules 202. In this way, probes 206 of the modules 202 can inject liquid nutrient/water and the probes 206 may extend into the growing media held in the retaining component 104. This may preferably occur during pauses in the rotation of plant rotating assembly 103. In an alternate example embodiment of an aeroponic growing system, said retaining components 104 may include sidewalls and sphincters which allow for precise injections of ultrasonic fog particles into each retaining component through the probe 206.

In normal operation, when plants held in retaining components are being allowed to simply receive light energy emitted from light emitting source 102, PLC 107 will cause motor 246 to drive belt 252 which, as a result of the interconnection through drive wheels 253, 254 and 250 with drive belts 249 and 252, with roller 199a will drive roller 199a in rotation thus rotating wheel 138a, also causing wheel 138b to rotate along with the rest of rotating assembly 103, about light emitting source 102 and longitudinal axis X.

When it is determined (for example by PLC 107 as a result of input from sensors) that it is appropriate to adjust the distance of a particular retaining component 104 from the light emitting source 102, drive shaft of motor 190 may be operated by PLC 107, and as a result of signals from the encoder associated with motor 190, motor 190 may rotate pivot rod 195 to adjust the position of rotating coupling devices 158a, 158b to a suitable engagement position.

Next PLC 107 causes respective support devices 141a, 141b to be rotated with rotation mechanism 108 to bring the end nuts 177a, 177b into engagement with stirrups 262a, 262b of shuttle devices 266 in respective housings 193a, 193b. Once the retaining component 104 to be adjusted is at a suitable angular position about axis X, rotation of the plant rotating assembly 103 can be stopped for a period of time (ie. by PLC 107 disengaging/stopping motor 246, and one of both of the positon adjustment mechanism 110 and dispensing assembly 200 may be employed and operated.

However, when the retaining component 104 is moved to the stopped position, the rotational engagement of ends nuts 177a, 177b on threaded rods 142a, 142b with stirrups 262a, 262b, causes shuttle devices 266 to move vertically upwards in unison within their housings 193a, 193b By virtue of the interconnection of cam tracks 267, with cam follower portions 283a, 283b, and the interconnection of cam follower 283 with socket support block 289 and socket shaft 279, as shuttle 266 moves vertically downward in housing 193a, the cam track/cam follower interaction will move cam support block 278, socket shaft 279 and drive motor shaft 281 forward longitudinally, being supported for longitudinal movement on rear cylinders 286 and front cylinders 287. This then causes sockets 280 to be able to engage with end nuts 177a, 177b. This allows motors 156a, 156b to be operated under the control of PLC 107 to rotate sockets 289 causing end nuts 177a, 177b to be rotated which causes their respective rods 142a, 142b, to be rotated (either clockwise or counter-clockwise) to thereby adjust the radial position of the retaining component 104 inward or outward.

Once sockets of actuator motors 156a, 156b are interconnected to nuts 177a, 177b of rods 142a, 142b respectively, actuator motors 156a, 156b may under the control of PLC 107 have their shafts 157a, 157b and associated sockets rotated to rotate rods 142a, 142b an appropriate amount either clockwise or counter clockwise. The rotational movement provided by drive shafts 157a, 157b of motors 156a, 156b, controlled by PLC 107, rotates rods 142a, 142b respectively causing connector plates 174a, 174b of the particular retaining component 104 to move linearly and radially outwardly and/or inwardly along rods 142a, 142b. This movement of connector plates 174a, 174b due to the rotation of rods 142a, 142b causes retaining components 104 to move in a radial trajectory/path relative to longitudinal axis X and light emitting source 102. The amount of movement provided along the path can be determined by PLC 107 based on the particular needs of the plants growing in the particular retaining component 104 at a particular time/in a particular time period. New and existing scientific data for a plant species defining its point of light saturation can be stored and utilized by PLC 107. Laser or photo optic sensors can also be deployed such that the radial distance from the top of the plant canopy to the light sources 102 can be measured and provided to PLC 107. In this way the distance between (i) each retaining component 104 and the plants contained therein and (ii) light emitting source 102 can be individually selected and may be optimized easily and automatically by PLC 107 so that the plants in a particular retaining component 104 may achieve the optimal amount and light intensity/amount of light energy from light emitting source 102.

Once the position of the retaining component 104 from light emitting source 102 has been suitably adjusted, the rotation of rods 142a, 142b ceases as the operation of actuator motors 156a, 156b by PLC 107 is terminated. Drive shaft of motor 190 may then be operated by PLC 107, and as a result of signals from the encoder with motor 190, motor 190 may rotate pivot rod 195 to adjust the position of rotating coupling device 158a and 158b so that the actuator motors 156a, 156b is moved so that the sockets 280a, 280b are removed from engagement with the end nuts 177a, 177b of rods 142a, 142b.

Alternatively or additionally, if it is determined by PLC 107 that it is appropriate to dispense water and/or nutrients and/or to verify the individual plant media variables(eg. level of dissolved solids, moisture content, pH, temperature) utilizing the probes 213 of the dispensing assembly 200, and thus determined the appropriate nutrient/water/pH dosing requirements of each of the plants held in a particular retaining component 104 while a retaining component 104 is stationary at the desired angular position relative to axis X, dispensing assembly 200 may be operated. To bring the probes 206 and 213 of each of the plurality of modules 202 into close proximity or penetration and preferably also engagement with the retaining component 104 and the plant/and growing medium located therein, actuating motor 230 may be operated under the control of PLC 107 to cause rotation of rod 220. The rotation of rod 220 in one of a clockwise or counter-clockwise direction thus can move arm member 203 and modules 202 secured thereto, in an axial direction along a radial trajectory inwardly toward the center of plant rotating assembly 103, longitudinal axis X and light emitting source 102. This movement can bring a plurality of nutrient/liquid dispensing modules 202 and their probes 206 and 213 removably into close proximity/contact with the plant/growing media contained within a suitably positioned retaining component 104. The retaining component 104 is positioned inwardly of the dispensing assembly 200 and generally on the same radial trajectory as modules 202 and probes 206 and 213. In this way, pump 216 under control of PLC 107 (FIG. 12) can be operated by PLC 107 to cause water/liquid nutrient to be delivered through hoses 209, based upon the requirements determined by the PLC 107 utilizing probes 213. The operation of pump 216 causes probes 206 of modules 202 to inject liquid nutrient/water into the retaining component 104. The probes 206 may extend into the body of the growing media held in the retaining component 202.

Dispensing assembly 200 may permit the penetration of a plant growing medium substrate within the retaining components 104 at the same angle during each injection operation. Thus the problems with dripping encountered with other rotary systems may be reduced or alleviated. Because each injector module 202 has its own input port 215 and corresponding probe 206 for nutrient/water injection, a variable number of modules may be attached to the dispensing assembly 200 depending on factors determined by the grower. Sensors to detect water content and dissolved solids, moisture content, pH, temperature, may also attached to the watering arm in order to ascertain the ideal amount of nutrition/water (and their optimal pH and temperature requirements) to be injected on a plant by plant basis.

When the dispensing operation is complete, the operation of pump 216 can be terminated by PLC 107 terminating the supply of water/liquid nutrient to the modules 202. To bring the probes 206 away from close proximity and possibly engagement with the retaining component 104 and the plant/and growing medium located therein, actuating motor 230 may be operated under the control of PLC 107 to cause rotation of rod 220. The rotation of rod 220 in the opposite rotational direction thus can move arm member 203 and modules 202 secured thereto, in an axial direction along a radial trajectory inwardly away from the center of plant rotating assembly 103, longitudinal axis X and light emitting source 102. This movement can bring a plurality of nutrient/liquid dispensing modules 202, away from the plant/growing media contained within a suitably positioned retaining component 104 to a parked position.

It will be appreciated that with rotary plant growing apparatus the grower/operator may have the ability to make adjustments to the light intensity/amount of light energy experienced by individual medium retaining members or growing frameworks in real-time, with such adjustments being made along radial trajectories inwardly and outwardly of the internal light emitting source 102. This variability may result in the advantage of optimal light use efficiency and/or increased plant yield.

Because the retaining components 104 can be moved independently of each other, along predetermined paths, preferably linear radial trajectories, and to one of a plurality of locations along the path, each of retaining components 104 may be moved to an optimal distance calculated using the averaged needs of the retaining component in question as opposed to basing the calculation on the needs of the entire cylinder of retaining components.

Various plants at various stages of growth, or alternatively many different species of photosynthetic organism, may be grown within the same plant apparatus 100, possibly using the same central light source or combination of light sources. This enables a degree of light intensity/amount of light energy optimization that may be at least comparable to horizontal layouts, while saving considerable energy otherwise required by the addition of light sources. As retaining components 104 move outward along their radial trajectories, they also necessarily move apart, enabling the occupants to grow laterally without tangling together or exhibiting symptoms of SAS.

In a preferred embodiment, any required modifications to the distance between retaining component 104 and the light emitting source 102 may be carried out at the same time that the dispensing of water/liquid nutrient is undertaken.

Figure 7:
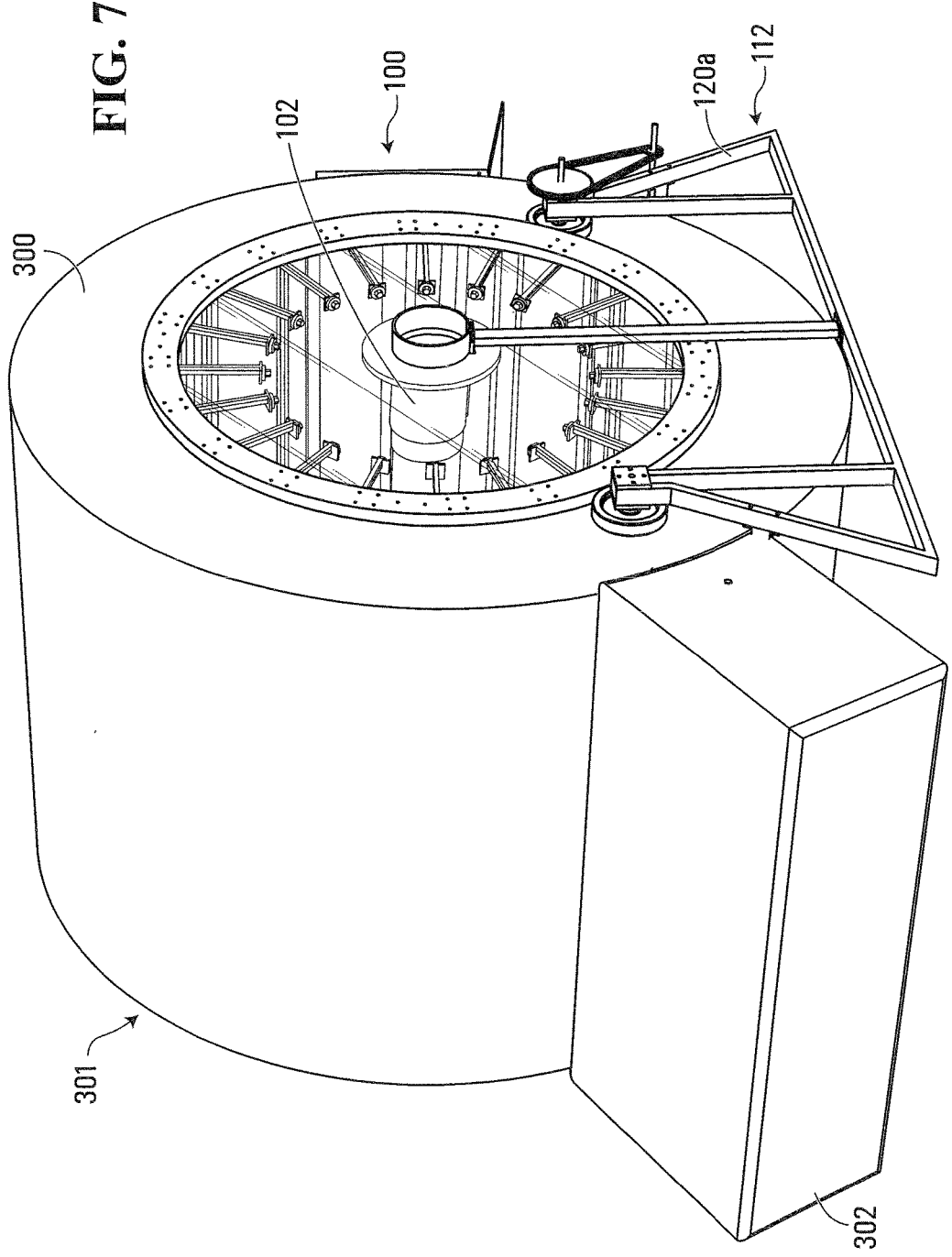
FIG. 7 is a perspective view of the apparatus of FIGS. 1 to 6 and with a hood.

With reference to FIG. 7, in some example alternate embodiments, rotary plant growing apparatus 100 may include a hood or cover 301 that at least partially encloses come components of apparatus 100 such that the environment within the rotary apparatus can be optimized to the biological requirements of the species of plant being grown. The hood 301 may isolate the growing environment from the ambient atmospheric conditions of the building housing the apparatus; thus reducing the HVAC requirement of building in which apparatus 100 is located, and further isolating the plants from undesired contact with personnel. Hood 301 may include a first portion 300 which substantially encloses the plant rotating assembly 103 including retaining components 104 and a second portion 302 which substantially encloses the position adjustment mechanism and the dispensing assembly 200. Hood 300 may have openings removably covered with panels to enclose the interior space of the hood.

PLC 107 may be in communication with sensors to control the environment within the hood by use of an external HVAC system in communication with the interior of the hood 301. Sensors may be employed to detect one or more environmental characteristics within the interior of the hood, such as pH, moisture level, air humidity, temperature, $CO^2$, $O^2$ amount of particulates. Sensors of various types such as temperature sensors, moisture/humidity sensors etc. may be provided within hood 301 to sense various conditions/characteristics within the hood 300 including the amount of moisture present in the growing medium of each retaining component 104. Sensors, such as laser sensors or photo optic sensors may also be employed to enable PLC 107 to monitor the height of plants each retaining component 104. The sensors may be in communication with PLC 107 and based on the signals provided by the sensors PLC 107 may take appropriate steps such as to adjust the distance between a specific retaining component 104 and light emitting source 102 and/or employ dispensing assembly 200 to inject water and/or liquid nutrients into a selected retaining component and the plants/growing medium held therein.

The above described embodiments are intended to be illustrative only and in no way limiting. The described embodiments of carrying out the invention are susceptible to many modifications of form, arrangement of parts, details and order of operation. Other modifications will be apparent to those skilled in the art and, therefore, the invention is defined in the claims.

By way of example only while rotational actuators are described above, other embodiments may employ pneumatic or hydraulic actuators to effect some or all of the movements described herein.

When introducing elements of the present invention or the embodiments thereof, the articles "a," "an," "the," and "said" are intended to mean that there are one or more of the elements. The terms "comprising," "including," and "having" are intended to be inclusive and mean that there may be additional elements other than the listed elements.

The invention claimed is:

1. A rotary plant growing apparatus comprising:
   (a) a light emitting source operable to emit light;
   (b) at least one retaining component;
   (c) a support operable to support said at least one retaining component in spaced relation to said light emitting source;
   (d) a rotation mechanism operable to rotate said at least one retaining component in a path around said light emitting source;
   (e) a position adjustment mechanism operable to move the at least one retaining component along a path extending between said at least one retaining component and said light emitting source so to adjust the distance between said at least one retaining component and said light emitting source;
   (f) a controller operable to control the operation of the position adjustment mechanism; and
   (g) a sensor in communication with the controller to provide signals indicative of a position of the at least one retaining component along the path.

2. An apparatus as claimed in claim 1 wherein said position adjustment mechanism is operable to move the at least one retaining component along a generally linear path extending towards said light emitting source.

3. An apparatus as claimed in claim 2 wherein said rotation mechanism is operable to rotate said at least one retaining component in orbital paths about an axis, and wherein said position adjustment mechanism is operable to move the at least one retaining component along a radial path extending between said at least one retaining component and said axis, so to adjust the distance between said at least one retaining component and said light emitting source.

4. An apparatus as claimed in claim 3 wherein the orbital paths are substantially circular.

5. An apparatus as claimed in claim 4 wherein said position adjustment mechanism is operable to move the at least one retaining component both inwardly and outwardly along a radial path so to adjust the radial distance between said at least one retaining component and said light emitting source.

6. An apparatus as claimed in claim 5 wherein said position adjustment mechanism is operable to move the at least one retaining component both inwardly and outwardly along a radial path so to provide for adjustment of the radial distance between said at least one retaining component and said light emitting source within a specific range of radial positions between an outer position and in inward position.

7. An apparatus as claimed in claim 3 wherein said light emitting source is supported at a position proximate to said axis and said position adjustment mechanism is operable to move the at least one retaining component along a radial path between said at least one retaining component and said axis, so to adjust the radial distance between said at least one retaining component and said light emitting source.

8. An apparatus as claimed in claim 1 wherein said at least one retaining component is operable to retain at least one plant.

9. An apparatus as claimed in claim 8 wherein said at least one retaining component is operable to retain said plant and a plant growing medium.

10. An apparatus as claimed in claim 1 wherein said plant growing apparatus comprises a plurality of retaining components, each of said retaining components being spaced from, and mounted for rotation around, said light emitting source, and wherein said position adjustment mechanism operable to independently move each of the plurality of retaining components along paths extending between each of said plurality of retaining component and said light emitting source so to independently adjust the distance between each of said plurality of retaining components and said light emitting source.

11. An apparatus as claimed in claim 10 wherein:
   said support is operable to support said plurality of retaining components in spaced angular relation to each other around said light emitting source; and said rotation mechanism is operable to rotate said plurality of retaining components in orbital paths around said light emitting source.

12. An apparatus as claimed in claim 11 wherein each of said plurality of retaining components is operable to retain at least one plant.

13. An apparatus as claimed in claim 12 wherein said position adjustment mechanism is operable to separately adjust the distance between each of said plurality of retaining components and said light emitting source.

14. An apparatus as claimed in claim 13 wherein said light emitting source is operable to emit light radially outward about an arc.

15. An apparatus as claimed in claim 14 wherein said light emitting source is operable to emit light radially outward in a 360 degree arc.

16. An apparatus as claimed in claim 15 wherein said apparatus comprises a rotational assembly supported and mounted for rotation on a frame, and wherein each of said retaining components comprises part of said rotational assembly and wherein said light emitting source is mounted within said rotational assembly, such that said rotational assembly is operable to rotate about said light emitting source.

17. An apparatus as claimed in claim 16 wherein said rotational assembly comprises:
   a. First and second support wheels, said first and second support wheels being generally transversely oriented and longitudinally spaced apart from each other;
   b. A plurality of generally longitudinally oriented support members extending between said first and second support wheels.

18. A rotary plant growing apparatus comprising:
(a) a light emitting source operable to emit light;
(b) at least one retaining component;
(c) a support operable to support said at least one retaining component in spaced relation to said light emitting source
(d) a rotation mechanism operable to rotate said at least one retaining component in a path around said light emitting source;
(e) a position adjustment mechanism operable to move the at least one retaining component along a path extending between said at least one retaining component and said light emitting source so to adjust the distance between said at least one retaining component and said light emitting source wherein:
said support comprises at least one rod operable to support said at least one retaining component in spaced relation to said light emitting source; and
said position adjustment mechanism is operable to engage said rod of said support to move the at least one retaining component along said path extending between said at least one retaining component and said light emitting source so to adjust the distance between said at least one retaining component and said light emitting source and said at least one rod is a rotatable rod and said position adjustment mechanism is operable to engage said at least one rod to rotate said at least one rod, such that rotation of said at least one rod adjusts the distance between said at least one retaining component and said light emitting source.

19. An apparatus as claimed in claim 18 wherein said support comprises first and second rods operable to support said at least one retaining component in spaced relation to said light emitting source and wherein said at least one position adjustment mechanism is operable to simultaneously rotate said first and second rods to adjust the radial distance between (i) said first and second support members and (ii) said light emitting source, to thereby adjust the radial distance between at least one of said plurality of medium retaining components and said light emitting source.

20. An apparatus as claimed in claim 18 wherein said rotational assembly comprises:
   a. First and second support wheels, said first and second support wheels being generally transversely oriented and longitudinally spaced apart from each other;
   b. A plurality of generally longitudinally oriented support members extending between said first and second support wheels, said plurality of support members being configured and operable to support said plurality of medium retaining components.

21. A rotary plant growing apparatus comprising:
(a) a light emitting source operable to emit light;
(b) a plurality of retaining components;
(c) a support operable to support the plurality of retaining components in spaced relation to said light emitting source;
(d) a rotation mechanism operable to rotate said plurality of retaining components in paths around said light emitting source;
(e) a position adjustment mechanism operable to independently move each of said plurality of retaining components to independently adjust the distances between each of the plurality of retaining components and said light emitting source;
(f) a controller operable to control the operation of the position adjustment mechanism; and
(g) a sensor in communication with the controller to provide signals indicative of the position of the plurality of retaining components.

22. A rotary plant growing apparatus comprising:
(a) a light emitting source operable to emit light;
(b) at least one retaining component;
(c) a support operable to support said at least one retaining component in spaced relation to said light emitting source;
(d) a rotation mechanism operable to rotate said at least one retaining component in a path around said light emitting source;
(e) a dispensing assembly operable to dispense liquid nutrients and/or water into said at least one retaining component, wherein said dispensing assembly comprises a probe movable between a first position wherein said probe is remote from said at least one retaining component and a second position wherein said probe is within said at least one retaining component.

23. An apparatus as claimed in claim 22 wherein said probe is operable to inject said liquid nutrients and/or water into a growing medium held in said at least one retaining component.

24. An apparatus as claimed in claim 23 wherein said dispensing assembly comprises a plurality of probes each movable between a first position wherein each of said probes is remote from said at least one retaining component, and a second position wherein each of said probes is within said at least one retaining component.

25. An apparatus as claimed in claim 22 wherein each of said probes has a separate input port for connection to a dedicated hose, each hose connected to a source of liquid nutrient and/or water and operable to communicate liquid nutrient and/or water to its respective probe.

26. An apparatus as claimed in claim 22 further comprising:

a sensor operable to detect a characteristic of a plant or plant growing medium held in said at least one retaining component, and a controller, in communication with said sensor, and operable to control the operation of said dispensing assembly in response to a signal received from said sensor.

27. A rotary plant growing apparatus comprising:

a light emitting source operable to emit light;

at least one retaining component;

a support operable to support said at least one retaining component in spaced relation to said light emitting source;

a rotation mechanism operable to rotate said at least one retaining component in a path around said light emitting source;

a hood at least partially enclosing within an interior said light emitting source, said at least one retaining component said support and said rotation mechanism.

28. An apparatus as claimed in claim 27 further comprising:

a sensor operable to detect a characteristic of an environment characteristic within said interior of said hood; and a controller, in communication with said sensor, operable to control the environment within the hood via an external HVAC system.

29. An apparatus as claimed in claim 28 wherein said environmental characteristic is one of pH, moisture level, air humidity, temperature, $CO^2$, $O^2$ or amount of particulates.

* * * * *